US012578944B2

(12) United States Patent
Woodward, Jr. et al.

(10) Patent No.: US 12,578,944 B2
(45) Date of Patent: Mar. 17, 2026

(54) INTERNET OF THINGS APPLICATION STORE

(71) Applicant: ROKU, INC., San Jose, CA (US)

(72) Inventors: Donald R. Woodward, Jr., Monte Sereno, CA (US); Robert C. Curtis, Los Gatos, CA (US); Gregory M. Garner, Key Colony Beach, FL (US)

(73) Assignee: Roku, Inc.

( * ) Notice: Subject to any disclaimer, the term of this patent is extended or adjusted under 35 U.S.C. 154(b) by 220 days.

(21) Appl. No.: 18/231,556

(22) Filed: Aug. 8, 2023

(65) Prior Publication Data

US 2025/0053399 A1 Feb. 13, 2025

(51) Int. Cl.
| | |
|---|---|
| *H04W 8/00* | (2009.01) |
| *G06F 3/0481* | (2022.01) |
| *G06F 8/61* | (2018.01) |
| *G06Q 30/0601* | (2023.01) |
| *H04L 67/12* | (2022.01) |
| *G16Y 40/35* | (2020.01) |

(52) U.S. Cl.
CPC .......... *G06F 8/61* (2013.01); *G06Q 30/0623* (2013.01); *G16Y 40/35* (2020.01)

(58) Field of Classification Search
CPC .................................. G06F 8/61; G16Y 10/00
See application file for complete search history.

(56) References Cited

U.S. PATENT DOCUMENTS

| | | | |
|---|---|---|---|
| 2015/0201022 A1* | 7/2015 | Kim .................... | H04W 12/068 |
| | | | 709/203 |
| 2016/0308957 A1* | 10/2016 | Zhang ................... | G06F 9/4484 |
| 2019/0306242 A1* | 10/2019 | Thummalapalli ... | H04L 41/0806 |
| 2020/0092701 A1* | 3/2020 | Arnberg ................ | H04L 67/306 |
| 2021/0301985 A1* | 9/2021 | Brown ...................... | F17D 5/06 |

OTHER PUBLICATIONS

U.S. Appl. No. 18/141,120, filed Apr. 28, 2023, and entitled "Map Generator for Map-Based Device Management", 46 pages.
(Continued)

*Primary Examiner* — S. Sough
*Assistant Examiner* — Mohammad H Kabir
(74) *Attorney, Agent, or Firm* — Sterne, Kessler, Goldstein & Fox P.L.L.C.

(57) ABSTRACT

Disclosed herein are system, method and/or computer program product embodiments, and/or combinations and subcombinations thereof for implementing an Internet of Things (IoT) application store. An embodiment provides a digital marketplace service and a smart installation service. The digital marketplace service enables a user to browse a plurality of IoT applications and select one for installation. The smart installation service determines an input or an output of the selected IoT application, selectively assigns a first IoT device in a set of IoT devices associated with the user to the input or the output, and installs an instance of the selected IoT application on one or more devices that comprise or are communicatively connected to the first IoT device, wherein the installing comprises configuring the instance of the selected IoT application to obtain the input from the first IoT device or provide the output to the first IoT device.

20 Claims, 8 Drawing Sheets

(56)                    References Cited

OTHER PUBLICATIONS

Extended European Search Report directed to related European Patent Application No. 24192957.9, mailed Nov. 29, 2024; 10 pages.

Scuillo et al. "WoT Store: Enabling Things and Applications Discovery for the W3C Web of Things" 2019 16th IEEE Annual Consumer Communications & Networking Conference (CCNC), Jan. 11, 2019, 8 pages.

* cited by examiner

400

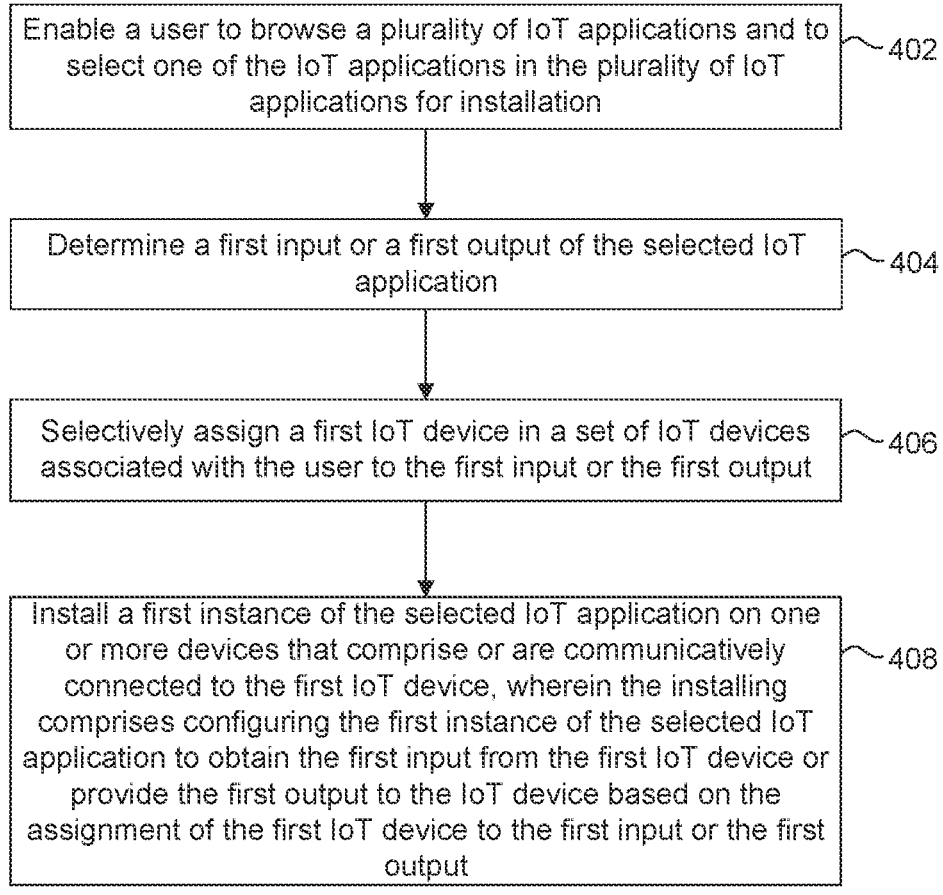

Enable a user to browse a plurality of IoT applications and to select one of the IoT applications in the plurality of IoT applications for installation ~402

Determine a first input or a first output of the selected IoT application ~404

Selectively assign a first IoT device in a set of IoT devices associated with the user to the first input or the first output ~406

Install a first instance of the selected IoT application on one or more devices that comprise or are communicatively connected to the first IoT device, wherein the installing comprises configuring the first instance of the selected IoT application to obtain the first input from the first IoT device or provide the first output to the IoT device based on the assignment of the first IoT device to the first input or the first output ~408

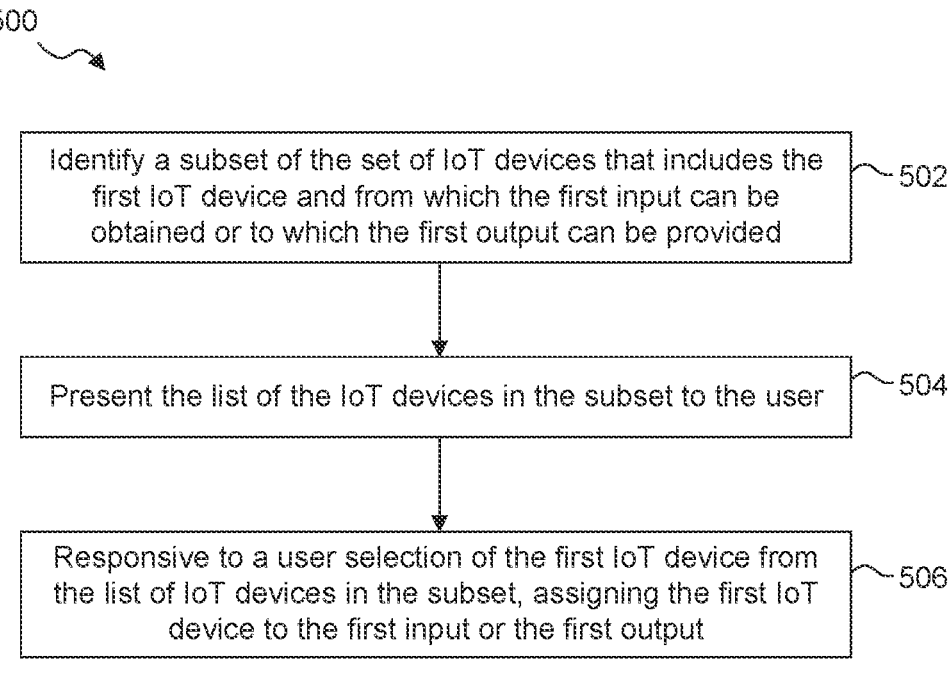

Identify a subset of the set of IoT devices that includes the first IoT device and from which the first input can be obtained or to which the first output can be provided ~502

Present the list of the IoT devices in the subset to the user ~504

Responsive to a user selection of the first IoT device from the list of IoT devices in the subset, assigning the first IoT device to the first input or the first output ~506

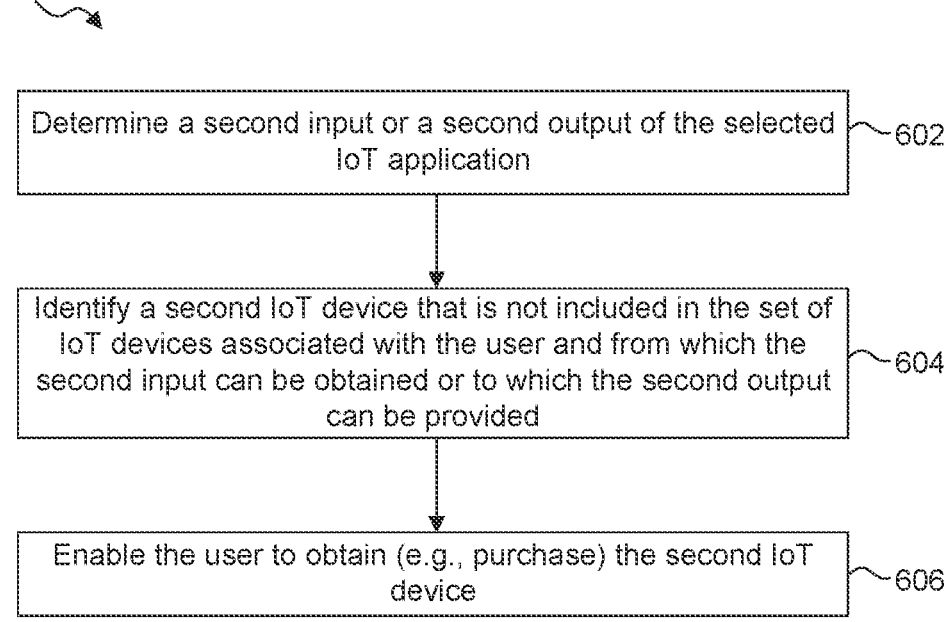

Determine a second input or a second output of the selected IoT application ~602

Identify a second IoT device that is not included in the set of IoT devices associated with the user and from which the second input can be obtained or to which the second output can be provided ~604

Enable the user to obtain (e.g., purchase) the second IoT device ~606

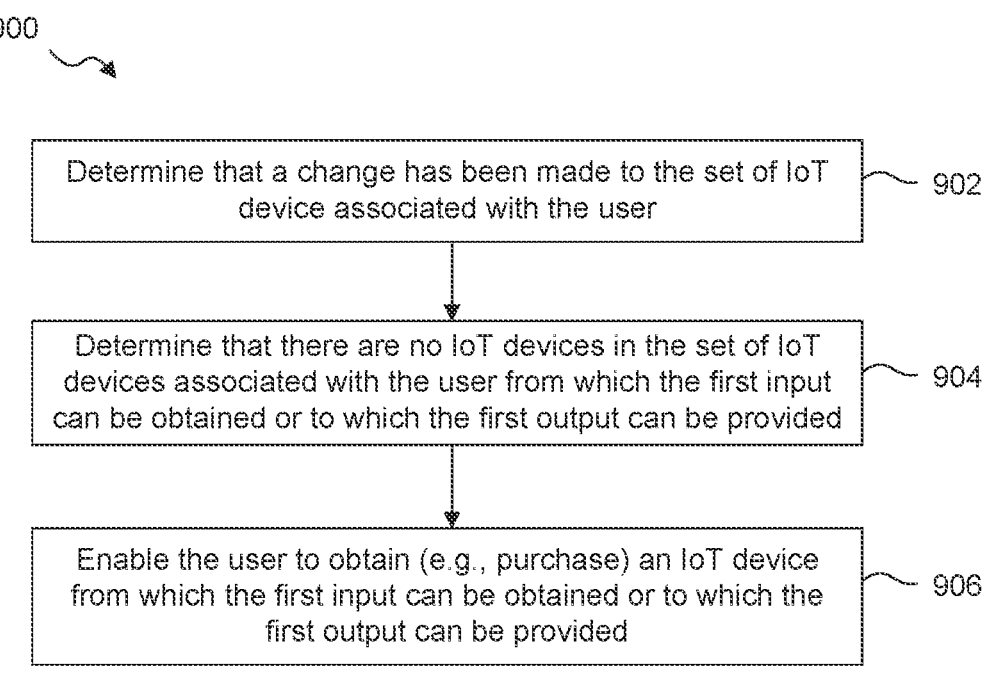

| Determine that a change has been made to the set of IoT device associated with the user | ~ 902 |

| Determine that there are no IoT devices in the set of IoT devices associated with the user from which the first input can be obtained or to which the first output can be provided | ~ 904 |

| Enable the user to obtain (e.g., purchase) an IoT device from which the first input can be obtained or to which the first output can be provided | ~ 906 |

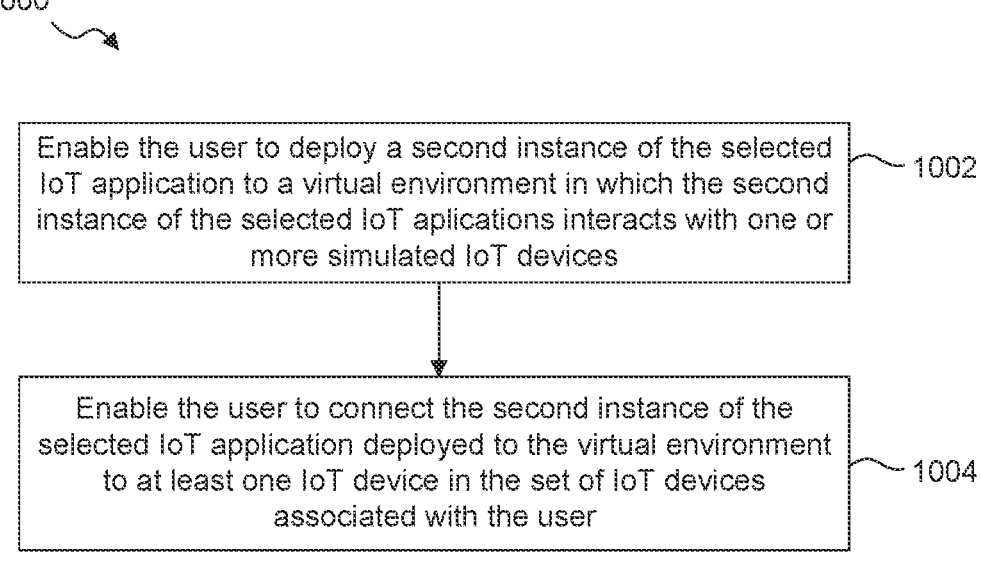

| Enable the user to deploy a second instance of the selected IoT application to a virtual environment in which the second instance of the selected IoT aplications interacts with one or more simulated IoT devices | ~ 1002 |

| Enable the user to connect the second instance of the selected IoT application deployed to the virtual environment to at least one IoT device in the set of IoT devices associated with the user | ~ 1004 |

FIG. 10

INTERNET OF THINGS APPLICATION STORE

BACKGROUND

Field

This disclosure is generally directed to a digital distribution platform for software applications, and in particular, to a digital distribution platform for software applications that are configured to control or otherwise interact with one or more Internet of Things (IoT) devices.

SUMMARY

Provided herein are system, apparatus, article of manufacture, method and/or computer program product embodiments, and/or combinations and sub-combinations thereof, for implementing an Internet of Things (IoT) application store. An embodiment provides a digital marketplace service and a smart installation service. The digital marketplace service enables a user to browse a plurality of IoT applications and to select one of the IoT applications in the plurality of IoT applications for installation. The smart installation service (i) determines a first input or a first output of the selected IoT application, (ii) selectively assigns a first IoT device in a set of IoT devices associated with the user to the first input or the first output, and (iii) installs a first instance of the selected IoT application on one or more devices that comprise or are communicatively connected to the first IoT device, wherein installing the first instance of the selected IoT application comprises configuring the first instance of the selected IoT application to obtain the first input from the first IoT device or provide the first output to the first IoT device based on the assignment of the first IoT device to the first input or the first output.

In an embodiment, the smart installation service selectively installs the first instance of the selected IoT application on one or more of a cloud computing platform, a computing device associated with the user, or an IoT device in the set of IoT devices.

In another embodiment, the smart installation service selectively assigns the first IoT device to the first input or the first output by identifying a subset of the set of IoT devices that includes the first IoT device and from which the first input can be obtained or to which the first output can be provided, presenting a list of the IoT devices in the subset to the user, and, responsive to a user selection of the first IoT device from the list of IoT devices in the subset, assigning the first IoT device to the first input or the first output.

In yet another embodiment, the smart installation service determines a second input or a second output of the selected IoT application, identifies a second IoT device that is not included in the set of IoT devices associated with the user and from which the second input can be obtained or to which the second output can be provided, and enables the user to obtain (e.g., purchase) the second IoT device.

In still another embodiment, the smart installation service selectively assigns the first IoT device in the set of IoT devices associated with the user to the first input or the first output at least by determining a set of capabilities associated with the first IoT device and determining that the first input can be obtained from the first IoT device or that the first output can be provided to the first IoT device based on the set of capabilities associated with the first IoT device.

In a further embodiment, the digital marketplace service enables the user to select configuration information associated with a second instance of the selected IoT application installed by another user, and the smart installation service configures the first instance of the selected IoT application based on the configuration information associated with the second instance of the selected IoT application installed by the other user.

A yet further embodiment also provides an automatic updating service that determines that a change has been made to the set of IoT devices associated with the user, and, responsive to at least determining that the change had been made, selectively assigns a second IoT device in the set of IoT devices associated with the user to the first input or the first output, and configures the first instance of the selected IoT application to obtain the first input from the second IoT device or provide the first output to the second IoT device.

A still further embodiment provides an automatic updating service that determines that a change has been made to the set of IoT devices associated with the user, and, responsive to at least determining that the change has been made, determine that there are no IoT devices in the set of IoT devices associated with the user from which the first input can be obtained or to which the first output can be provided, and enables the user to obtain (e.g., purchase) an IoT device from which the first input can be obtained or to which the first output can be provided.

An additional embodiment also provides a virtual deployment service that enables the user to deploy a second instance of the selected IoT application to a virtual environment in which the second instance of the selected IoT application interacts with one or more simulated IoT devices. In further accordance with such an embodiment, the virtual deployment service may further enable the user to connect the second instance of the selected IoT application deployed to the virtual environment to at least one IoT device in the set of IoT devices associated with the user.

BRIEF DESCRIPTION OF THE FIGURES

The accompanying drawings are incorporated herein and form a part of the specification.

FIG. 4 illustrates a flow diagram of a method for implementing an IoT application store, according to some embodiments.

FIG. 5 illustrates a flow diagram of a method for selectively assigning an IoT device in a set of IoT devices associated with a user to an input or an output of an IoT application, according to some embodiments.

FIG. 6 illustrates a flow diagram of a method for enabling a user to obtain an IoT device from which an input of an IoT application can be obtained or to which an output of the IoT application can be provided, according to some embodiments.

FIG. 9 illustrates a flow diagram of a method for enabling a user to obtain an IoT device to be used with an IoT application in response to determining that a change has been made in a set of IoT devices associated with the user, according to some embodiments.

FIG. 10 illustrates a flow diagram of a method for enabling a user to deploy an instance of an IoT application to a virtual environment, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
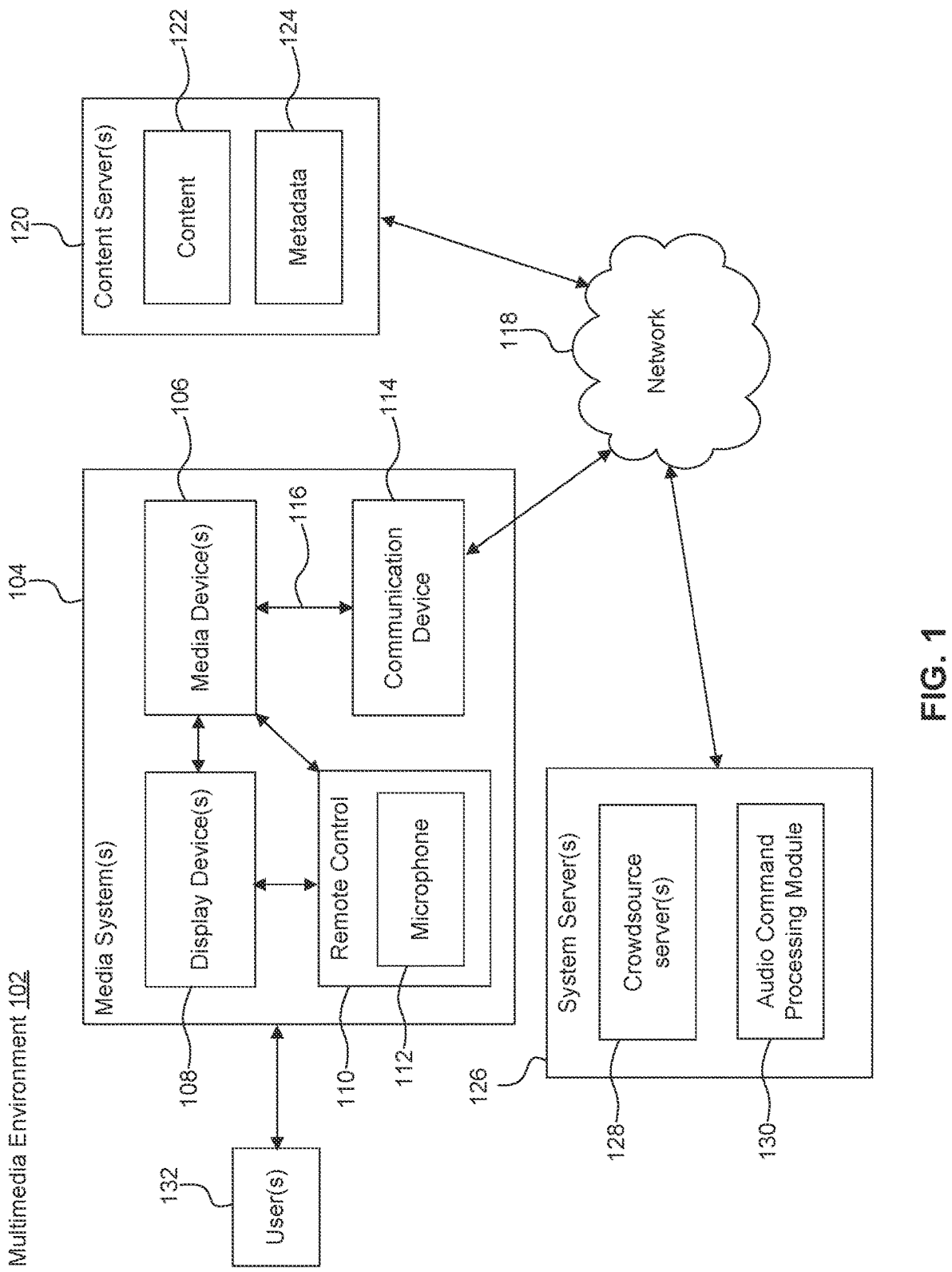
FIG. 1 illustrates a block diagram of a multimedia environment, according to some embodiments.

Modern living and working spaces, such as homes, hotels, or offices, are increasingly equipped with many devices that are configured to engage in digital communications. These devices may range from traditional internet-connected devices such as personal computers, telephone systems, security systems, gaming systems, and over-the-top (OTT) streaming media players, to newer devices including "smart home" devices such as connected appliances, utilities, lights, switches, power outlets, and speakers, as well as wearable devices such as watches and/or health monitors, among countless other examples. These devices may generally be referred to as "Internet of Things" (IoT) devices.

Typically, software for controlling an IoT device, such as a "smart home" device, is developed by the manufacturer of the IoT device and pre-installed on the IoT device before it is distributed to a consumer. Consequently, the consumer is limited to using only this manufacturer-supplied software to control the IoT device. Furthermore, the software that ships with a particular/IoT device typically provides only a limited set of capabilities that are directly tied to the particular sensors and/or actuators that exist on that IoT device. Additionally, other than a predefined set of user-configurable device settings or preferences, there is typically no means provided by which an end user can experiment with or creatively exploit the features (e.g., hardware features) of the IoT device. Moreover, a given user may own a diverse set of IoT devices, but such IoT devices typically cannot operate together to perform useful functions unless they are manufactured by the same company and configured from the outset to do so.

Provided herein are system, apparatus, device, method and/or computer program product embodiments, and/or combinations and sub-combinations thereof, for implementing an IoT application store that addresses one or more of the foregoing issues associated with conventional IoT device installations. As will be described herein, the IoT application store may comprise a digital marketplace service. The digital marketplace service may enable a user to browse a plurality of IoT applications that may be used to control or otherwise interact with a set of IoT devices owned by or otherwise associated with the user, and to select one of the IoT applications in the plurality of IoT applications for installation.

The IoT application store may further comprise a smart installation service. The smart installation service may automatically map inputs and/or outputs of the selected IoT application to particular IoT devices in the set of IoT devices associated with the user, and install an instance of the selected IoT application to one or more devices that are communicatively connected to and/or comprise the particular IoT devices. Such installation may include configuring the installed instance of the selected IoT application to obtain the inputs from and/or provide the outputs to the particular IoT devices in accordance with the aforementioned mapping.

The IoT application store may further comprise an automatic updating service. The automatic updating service may determine that a change has been made to the set of IoT devices associated with the user. For example, the automatic updating service may determine that an IoT device that was previously assigned to an input or output of the instance of the application is no longer functioning or is otherwise unavailable. In response to at least this determination, the automatic updating service may selectively assign a different IoT device in the set of IoT devices associated with the user to the input or output and configure the instance of the IoT application to obtain the input or provide the output to the different IoT device. Additionally or alternatively, the automatic updating service may enable the user to obtain a new IoT device from which the input can be obtained or to which the output can be provided.

The IoT application store may further comprise a virtual deployment service. The virtual deployment service may enable the user to deploy an instance of the selected IoT application to a virtual environment in which the instance of the selected IoT application may interact with one or more simulated IoT devices. This may enable the user to observe the performance of the selected IoT application, determine the suitability of the selected IoT application for installation with the user's IoT devices, and/or test various configurations of the IoT application without first purchasing the IoT application or installing it on physical devices associated with the user. The virtual deployment service may also enable the user to test various changes to the IoT application after installation thereof in the virtual environment without affecting the current (physical) setup. The virtual deployment service may further enable the user to connect an instance of the selected IoT application that is deployed to the virtual environment to one or more physical IoT devices associated with the user to enable the user to observe how the IoT application performs with those physical IoT devices.

These and various other features and advantages of an IoT application store in accordance with various embodiments will be described in detail herein. Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as Wi-Fi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106 and/or display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106 and/or display device 108 using cellular, Bluetooth, infrared, etc., or any combination thereof. Remote control 110 may include a microphone 112, which is further described below.

Multimedia environment 102 may include a plurality of content servers 120 (also called content providers, channels or sources 120). Although only one content server 120 is shown in FIG. 1, in practice multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to content 122. Metadata 124 may also or alternatively include one or more indexes of content 122, such as but not limited to a trick mode index.

Multimedia environment 102 may include one or more system servers 126. System servers 126 may operate to support media devices 106 from the cloud. It is noted that the structural and functional aspects of system servers 126 may wholly or partially exist in the same or different ones of system servers 126.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users 132 watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streamings of the movie.

System servers 126 may also include an audio command processing module 130. As noted above, remote control 110 may include microphone 112. Microphone 112 may receive audio data from users 132 (as well as other sources, such as the display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which is then forwarded to audio command processing module 130 in system servers 126. Audio command processing module 130 may operate to process and analyze the received audio data to recognize user 132's verbal command. Audio command processing module 130 may then forward the verbal command back to media device 106 for processing.

Figure 2:
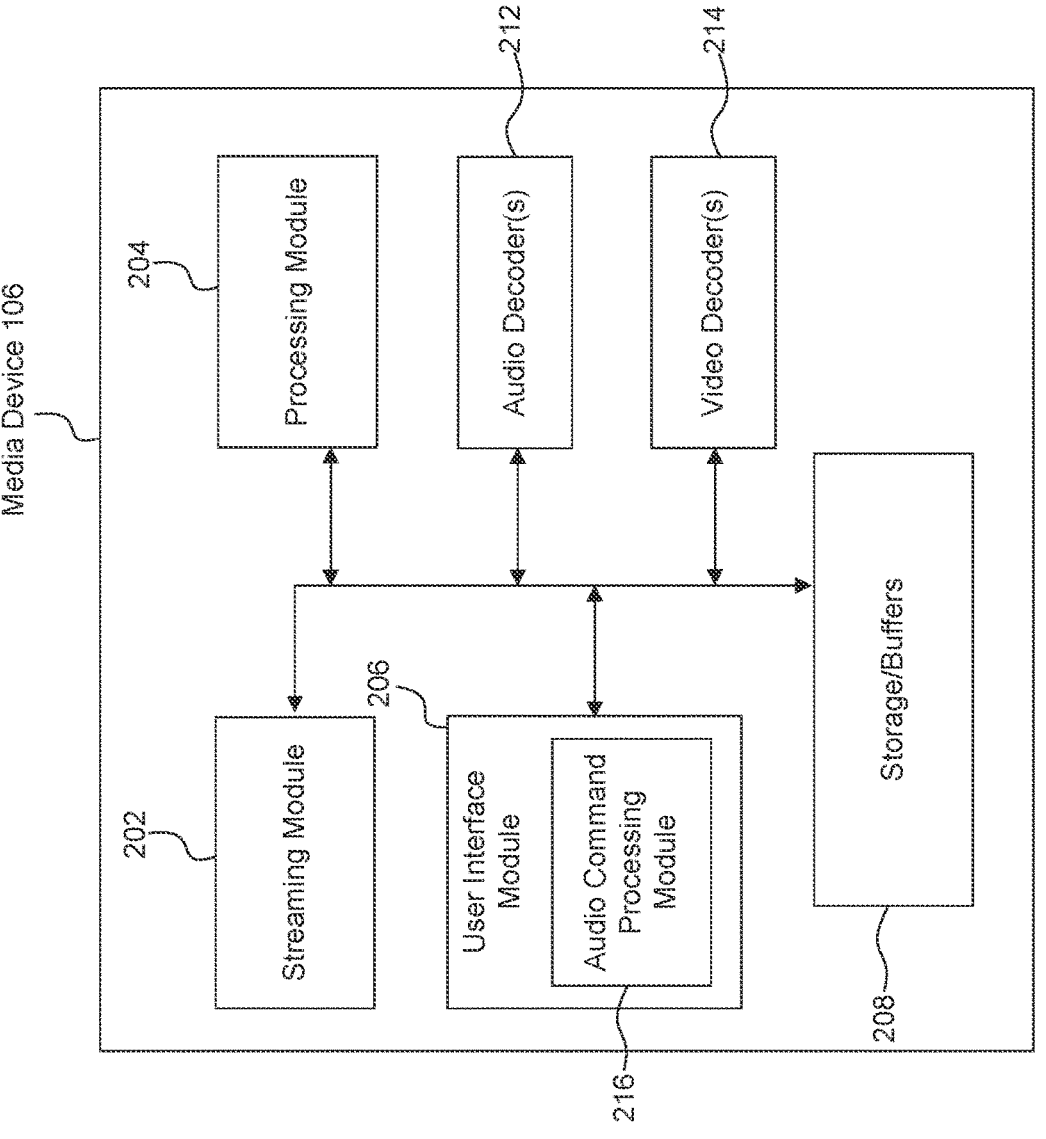
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

FIG. 2 illustrates a block diagram of an example media device 106, according to some embodiments. Media device 106 may include a streaming module 202, a processing module 204, storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 for playback to user 132.

In streaming embodiments, streaming module 202 may transmit the content to display device 108 in real time or near real time as it receives such content from content server(s) 120. In non-streaming embodiments, media device 106 may store the content received from content server(s) 120 in storage/buffers 208 for later playback on display device 108.

Internet of Things Application Store

Figure 3:
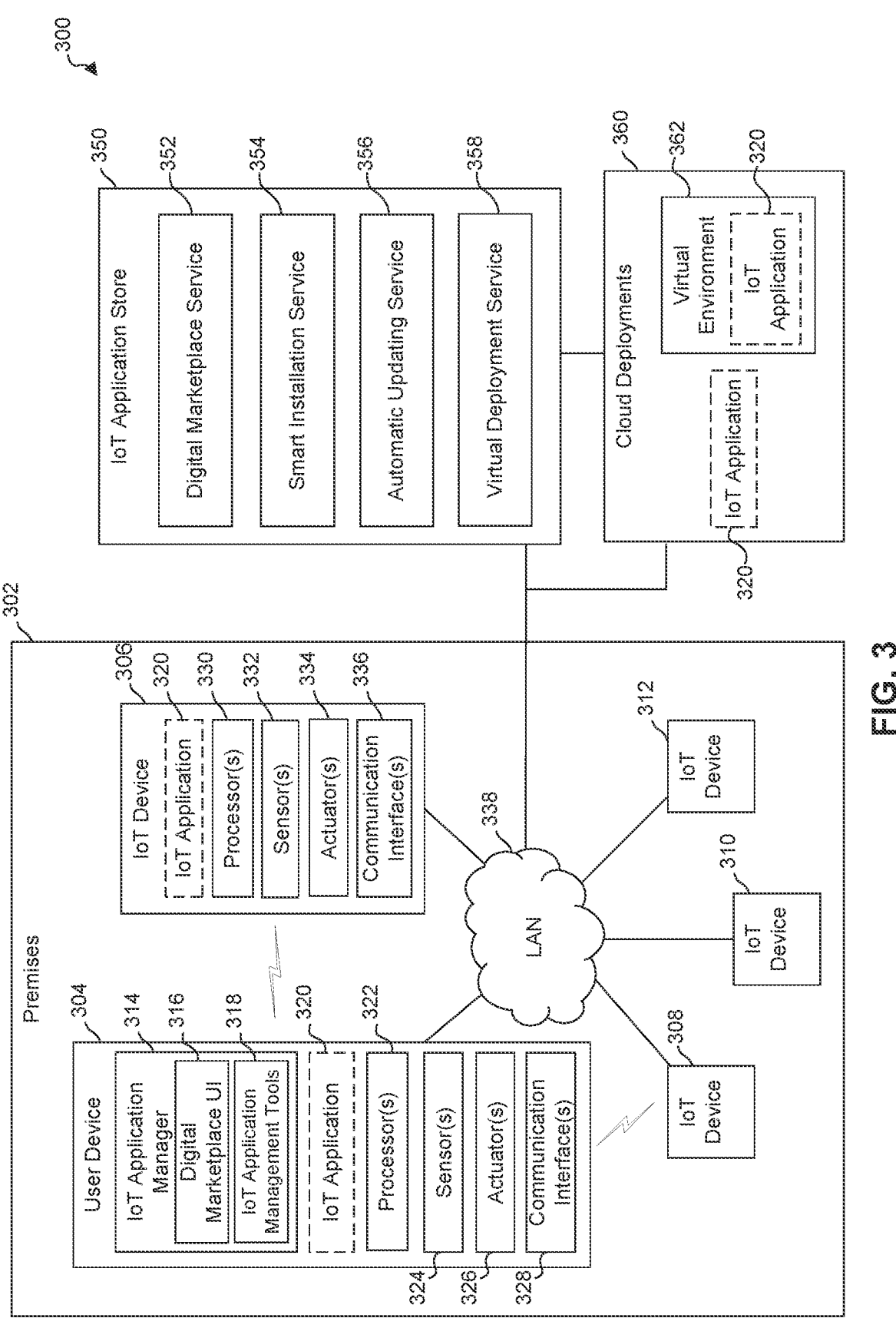
FIG. 3 illustrates a block diagram of a system for implementing an IoT application store, according to some embodiments.

FIG. 3 illustrates a block diagram of a system 300 for implementing an IoT application store, according to some embodiments. As shown in FIG. 3, system 300 includes a premises 302 in which a plurality of IoT devices 306, 308, 310 and 312 are present. Premises 302 may comprise, for example and without limitation, a home, an office, a building, a factory, a warehouse, a bar, a restaurant, a movie theater, a stadium, an auditorium, a car, a bus, a boat, or any other structure, location or space in which IoT devices may be present. Although only four IoT devices are shown as being present in premises 302 for the sake of illustration, it should be understood that premises 302 may include any number of IoT devices, including tens, hundreds or even thousands of IoT devices.

As used herein, the term "IoT device" is intended to broadly encompass any device that is capable of engaging in digital communication with another device. For example, a device that can digitally communicate with another device can comprise an IoT device, as that term is used herein, even if such communication does not occur over the Internet.

Each of IoT devices 306, 308, 310 and 312 may comprise a device such as, for example, a smart phone, a laptop computer, a notebook computer, a tablet computer, a netbook, a desktop computer, a video game console, a set-top box, or an OTT streaming media player. Furthermore, each of IoT devices 306, 308, 310 and 312 may comprise a so-called "smart home" device such as, for example, a smart lightbulb, a smart switch, a smart refrigerator, a smart washing machine, a smart dryer, a smart coffeemaker, a smart alarm clock, a smart smoke alarm, a smart carbon monoxide detector, a smart security sensor, a smart doorbell camera, a smart indoor or outdoor camera, a smart door lock, a smart thermostat, a smart plug, a smart television, a smart speaker, a smart remote controller, or a voice controller. Still further, each of IoT devices 306, 308, 310 and 312 may comprise a wearable device such as a watch, a fitness tracker, a health monitor, a smart pacemaker, or an extended reality headset. However, these are only examples and are not intended to be limiting.

IoT devices 306, 308, 310 and 312 may be communicatively connected to a local area network (LAN) 338 via a suitable wired and/or wireless connection. LAN 338 may be implemented using a hub-and-spoke or star topology. For example, in accordance with such an implementation, each of IoT devices 306, 308, 310 and 312 may be connected to a router via a corresponding Ethernet cable, wireless access point (AP), or IoT device hub. The router may include a modem that enables the router to act as an interface between entities connected to LAN 338 and an external wide area network (WAN), such as the Internet. Alternatively, LAN 338 may be implemented using a mesh network topology. For example, in accordance with such an implementation, each of IoT devices 306, 308, 310, and 312 may be linked directly to the other three IoT devices such that it can communicate directly therewith without a router. However, these are examples only, and other techniques for implementing LAN 338 may be used.

As further shown in FIG. 3, IoT device 306 may comprise one or more processors 330, one or more sensors 332, one or more actuators 334, and one or more communication interfaces 336. Processor(s) 330 may comprise one or more central processing units (CPUs), microcontrollers, microprocessors, signal processors, ASICs (application specific integrated circuits), and/or other physical hardware processor circuits for performing tasks such as program execution, signal coding, data processing, input/output processing, power control, and/or other functions.

Sensor(s) 332 may comprise one or more devices or systems for detecting and responding to (e.g., measuring, recording) objects and events in the physical environment of IoT device 306. By way of example only and without limitation, sensor(s) 332 may include one or more of a camera or other optical sensor, a microphone or other audio sensor, a radar system, a LiDAR system, a Wi-Fi sensing system, a temperature sensor, a pressure sensor, a proximity sensor, an accelerometer, a gyroscope, a magnetometer, an infrared sensor, a gas sensor, or a smoke sensor.

Actuator(s) 334 may comprise one or more devices or systems that are operable to effect a change in the physical environment of IoT device 306. By way of example only and without limitation, actuator(s) 334 may comprise a component that connects a device to a power source, disconnects a device from a power source, switches a light on or off, adjusts a brightness or a color of a light, turns an audible alarm on or off, adjusts the volume of an audible alarm, initiates a call to a security service, turns a heating or cooling system on or off, adjusts a target temperature associated with a heating or cooling system, locks or unlocks a door, rings a doorbell, initiates capture of video or audio, changes a channel or configuration of a television, adjusts the volume of an audio output device, or the like.

Communication interface(s) 336 may comprise components suitable for enabling IoT device 306 to wirelessly communicate with other devices via a corresponding wireless protocol. Communication interface(s) 336 may include, for example and without limitation, one or more of: a Wi-Fi interface that enables IoT device 306 to wirelessly communicate with an access point or other remote Wi-Fi-capable device according to one or more of the wireless network protocols based on the IEEE (Institute of Electrical and Electronics Engineers) 802.11 family of standards, a cellular interface that enables IoT device 306 to wirelessly communicate with remote devices via one or more cellular networks, a Bluetooth interface that enables IoT device 306 to engage in short-range wireless communication with other Bluetooth-enabled devices, or a Zigbee interface that enables IoT device 306 to wirelessly communicate with other Zigbee-enabled devices.

Communication interface(s) 336 may additionally or alternatively comprise components suitable for enabling IoT device 306 to communicate over a wired connection with other devices via a corresponding wired protocol, such as a Universal Serial Bus (USB) connection and protocol or Ethernet connection and protocol.

As further shown in FIG. 3, IoT device 306 may have installed thereon an instance of an IoT application 320, or a distributed component thereof. As will be discussed herein, such IoT application 320 may be selected for installation by a user from among a plurality of IoT applications presented by a digital marketplace service 352 of an IoT application store 350. In a case in which the instance of IoT application 320 is installed on IoT device 306, such instance may be executed by processor(s) 330.

Each of IoT devices 308, 310 and 312 may include similar components to those shown with respect to IoT device 306. Thus, for example, each of IoT device 308, 310 and 312 may include one or more processors, one or more sensors, one or more actuators, and one or more communication interfaces. Likewise, each of IoT devices 308, 310 and 312 may have installed thereon an instance of IoT application 320 or a distributed component thereof.

User device 304 is intended to represent a personal computing device or media device associated with a user. For example, in an embodiment in which multimedia environment is present in premises 302, user device 304 may comprise media device 106, and a user interface of user device 304 may be presented to a user via display device 108. User device 304 may also comprise a smart phone, a laptop computer, a notebook computer, a tablet computer, a netbook, a desktop computer, a video game console, or a wearable device (e.g., smart watch, extended reality headset). User device 304 may include one or more processors 322, one or more sensor(s) 324, one or more actuators 326, one or more communication interfaces 328, and an IoT application manager 314.

Processor(s) 322 may comprise one or more CPUs, microcontrollers, microprocessors, signal processors, ASICs, and/or other physical hardware processor circuits for performing tasks such as program execution, signal coding, data processing, input/output processing, power control, and/or other functions.

Sensor(s) 324 may comprise one or more devices or systems for detecting and responding to (e.g., measuring, recording) objects and events in the physical environment of user device 304. Sensor(s) 324 may include, for example, one or more of the sensor types previously described in reference to sensor(s) 332 of IoT device 306.

Actuator(s) 326 may comprise one or more devices or systems that are operable to effect a change in the physical environment of user device 304. Actuator(s) 326 may comprise, for example, one or more of the actuator types previously described in reference to actuator(s) 334 of IoT device 306.

Communication interface(s) 328 may comprise components suitable for enabling user device 304 to communicate with other devices via a wired or wireless communication medium using a corresponding wired or wireless communication protocol. Communication interface(s) 328 may comprise, for example, one or more of the communication interface types previously described in reference to communication interface(s) 336 of IoT device 306.

IoT application manager 314 may be implemented as processing logic that can comprise hardware (e.g., circuitry, dedicated logic, programmable logic, microcode, etc.), software (e.g., instructions executing on a processing device), or a combination thereof. IoT application manager 314 may comprise a software application that is executed by processor(s) 322 of user device 304. IoT application manager 314 may enable a user to browse, install, configure and execute IoT applications that are configured to control or otherwise interact with IoT devices present in premises 302, including one or more of IoT devices 306, 308, 310 and 312. As shown in FIG. 3, IoT device manager 314 may include a digital marketplace user interface (UI) 316 and IoT application management tools 318.

Digital marketplace UI 316 may comprise a UI that enables a user to browse various IoT applications presented by digital marketplace service 352 of IoT application store 350 (described in more detail herein), and select IoT applications for installation. In certain embodiments or scenarios, selecting an IoT application for installation may entail purchasing the IoT application. Such IoT applications may be used to control or otherwise interact with IoT devices within premises 302, including one or more of IoT devices 306, 308, 310 and 312. Depending upon the implementation, digital marketplace UI 316 may comprise a graphical UI (GUI), a menu-driven UI, a touch UI, a voice UI, a form-based UI, a natural language UI, or the like.

IoT application management tools 318 may comprise functionalities of IoT device manager 314 that enable a user to manage an installed instance of an IoT application. For example, IoT application management tools 318 may enable a user to configure, execute or uninstall a previously-installed instance of an IoT application. IoT application management tools 318 may further enable a user to invoke an automatic updating service 356 of IoT application store 350. As will be discussed herein, automatic updating service 356 may automatically reconfigure inputs, outputs and/or other aspects of an installed instance of an IoT application in response to changes detected with respect to IoT devices in premises 302, as well as in response to other factors.

As further shown in FIG. 3, user device 304 may have installed thereon an instance of IoT application 320, or a distributed component thereof. As previously noted, such IoT application 320 may be selected for installation by a user from among a plurality of IoT applications presented by digital marketplace service 352 of IoT application store 350. In a case in which the instance of IoT application 320 is installed on user device 304, such instance may be executed by processor(s) 322.

Although only a single user device 304 is shown in FIG. 3, it is to be understood that multiple user devices may be present in premises 302, and each such user device may be configured in a like manner to user device 304. Furthermore, although IoT application manager 314 is shown as part of user device 304 in FIG. 3, it should be understood that additional instances of IoT application manager 314 may be implemented on other devices within premises 302, including on one or more of IoT devices 306, 308, 310 or 312.

As further shown in FIG. 3, system 300 includes an IoT application store 350. IoT application store 350 may be implemented as processing logic that can comprise hardware (e.g., circuitry, dedicated logic, programmable logic, microcode, etc.), software (e.g., instructions executing on a processing device), or a combination thereof. IoT application store 350 may be implemented by one or more devices (e.g., one or more servers) that are remote from premises 302 but communicatively connected thereto (e.g., communicatively connected to LAN 338) via one or more networks. However, certain features of IoT application store 350 that are described herein may alternatively be implemented by a device within premises 302, such as by user device 304, or one of IoT devices 306, 308, 310, 312.

IoT application store 350 may comprise a digital marketplace service 352. Digital marketplace service 352 may enable a user (e.g., a user associated with premises 302) to browse a plurality of IoT applications and to select certain IoT applications in the plurality of IoT applications for installation. For example, a user may interact with digital marketplace service 352 via digital marketplace UI 316 to browse a plurality of IoT applications that are available for installation and to potentially select one or more IoT applications for installation.

Digital marketplace service 352 may support a search feature that enables a user to search for IoT applications based on one or more user-provided inputs such as, but not limited to, keywords or natural language descriptions. Digital marketplace service 352 may organize available IoT applications into different classes or categories, and enable a user to browse within such classes or categories. The classes or categories may be defined based on functionality, applicable IoT device type(s), or the like. Digital marketplace service 352 may rank IoT applications by popularity, cost, user reviews, or the like, and such rankings may be presented for all IoT applications or for IoT applications within a particular class or category.

Digital marketplace service 352 may be able to access information about a set of IoT devices associated with a user. For example, digital marketplace service 352 may be able to access information about IoT devices associated with a user in premises 302, including IoT devices 306, 308, 310 and 312. Such information may include, for example and without limitation, a device type, a device manufacturer, a device model, a device software/firmware version, a description of device capabilities, a description of device sensor types, a description of device actuator types, or the like, associated with each IoT device in the set of IoT devices associated with the user. Digital marketplace service 352 may utilize such information to filter an available set of IoT applications to identify a subset thereof that is operable with or otherwise relevant to particular IoT devices in the set of IoT devices associated with the user, and to present the subset of IoT applications to the user.

Digital marketplace service 352 may enable a user to purchase an IoT application as part of selecting the IoT application for installation. Any of a wide variety of well-known digital payment methods may be used to transact a purchase of an IoT application. Digital marketplace service 352 may also enable a user to selectively install an IoT application for free or on a trial basis. IoT application store 350 may also represent a non-commercial means for distributing IoT applications, in which case all of the IoT applications made available by digital marketplace service 352 may be selectively installed free of charge. For example, IoT application store 350 may be implemented by an enterprise and used to distribute IoT applications to various offices, factories, or other locations within the enterprise free of charge.

IoT applications made available for distribution by digital marketplace service 352 may comprise software that, when executed by one or more processors, controls or interacts with one or more IoT devices. For example, an IoT application may collect sensor data from one or more sensors of one or more IoT devices and process such collected sensor data for a variety of purposes. As another example, an IoT application may control one or more actuators of one or more IoT devices to perform one or more actions. By way of further example, an IoT application may collect sensor data from one or more sensors of one or more IoT devices, process the collected sensor data, and, based on the processing of the collected sensor data, control one or more actuators of one or more IoT devices to perform one or more actions.

IoT applications made available for distribution by digital marketplace service 352 may be configured for execution on a cloud computing platform, on a user device (e.g., user device 304), or on an IoT device (e.g., any of IoT devices 306, 308, 310, 312). IoT applications made available for distribution by digital marketplace service 352 may also be configured for execution in a distributed manner across a plurality of devices to facilitate one or more of improved performance, resource sharing, redundancy, or resiliency. For example, an IoT application may be configured for execution in a distributed manner across a plurality of IoT devices, across a plurality of user devices, or across a combination of IoT device(s), user device(s) and cloud servers. A given IoT application made available for distribution by digital marketplace service 352 may also be represented by a plurality of different codebases, each of which may be configured for execution on a different set of host device(s), thereby enabling the IoT application to be selectively installed in a variety of different configurations.

IoT applications made available for distribution by digital marketplace service 352 may be built on and include application programming interfaces (APIs) that translate between high-level or generic commands and IoT device specific commands. Such APIs may be made available to IoT application developers to enable them to easily code IoT applications that can be utilized with a wide variety of different IoT devices or IoT device types. Thus, for example, an API may expose a command that specifies that video should be captured from a camera and the API may translate between that command and a specific set of operations for capturing video from a camera of a particular IoT device make and model.

IoT applications made available for distribution by digital marketplace service 352 may also be built on and include APIs for third-party services to enable such third-party services to be integrated into the IoT applications. For example, IoT applications made available for distribution by digital marketplace service 352 may incorporate APIs associated with social media platforms, microblogging services, video sharing services, email services, streaming media services, digital assistant services, or the like, so that features of these services may be incorporated into the IoT applications. Some straightforward and non-limiting examples of IoT applications that may incorporate third party services include an IoT application that turns on a smart lightbulb or turns a smart lightbulb a particular color in response to a message being received via a social media platform or an IoT application that activates a smart doorbell when an email is received by an email service.

Digital marketplace service 352 may provide IoT device users with access to a wide variety of IoT applications that extend far beyond the manufacturer-supplied software typically provided with an IoT device. For example, digital marketplace service 352 may enable IoT device users to access IoT applications developed by IoT device manufacturers, third parties, independent developers, power users, or the like. Digital marketplace service 352 may also provide IoT device users with access to IoT applications that can extend the capabilities of their IoT devices beyond an original set of capabilities supported by those IoT devices at the time of purchase. Such IoT applications may, for example, enable an end user to experiment or creatively exploit the features of an IoT device in a manner not contemplated by the IoT device manufacturer. Furthermore, such IoT applications may enable diverse IoT devices (e.g., IoT devices of different types and/or manufactured by different companies) to work together to perform useful functions that each IoT device acting alone could not possibly perform.

Various example IoT applications that may be made available for distribution by digital marketplace service 352 will now be described. These example IoT applications are presented herein by way of example only and are by no means limiting. Persons skilled in the relevant art(s) will readily appreciate that a virtually unlimited variety of IoT applications may be made for distribution by digital marketplace service 352.

An example IoT application that may be distributed by digital marketplace service 352 may control a color, a brightness, and/or an on/off state of various smart lightbulbs in a premises in accordance with a Christmas theme, a Halloween theme, or other theme.

Another example IoT application that may be distributed by digital marketplace service 352 may comprise a music visualizer application that controls a color, a brightness, and/or an on/off state of various smart lightbulbs in a premises over time in a manner that is synchronized with a song playing in a premises and captured by one or more microphones.

Another example IoT application that may be distributed by digital marketplace service 352 may comprise a "light stream" application that controls a color, a brightness, and/or an on/off state of various smart lightbulbs over time in a manner that is synchronized with audio content and/or video content being streamed to a media playback device (a "light stream"). In further accordance with this example, the IoT application may include information that specifies how to carry out the display at the time of installation, may retrieve such information from IoT application store 350, or such information may be streamed along with the audio content and/or video content and provided to the IoT application at the time of playback.

Another example IoT application that may be distributed by digital marketplace service 352 may utilize a machine learning (ML) model (e.g., a visual ML classifier) to detect deer (or other animals, people or objects) based on video images captured by a camera (e.g., an outdoor camera) of an IoT device.

Another example IoT application that may be distributed by digital marketplace service 352 may utilize an ML model (e.g., an audio ML classifier) to detect a baby crying (or other sounds) based on audio captured by a microphone of an IoT device.

Another example IoT application that may be distributed by digital marketplace service 352 may enable a smart doorbell to play custom doorbell chimes.

Another example IoT application that may be distributed by digital marketplace service 352 may utilize generative artificial intelligence (AI) to control IoT devices to produce various effects (e.g., to control a set of smart lightbulbs to produce interesting patterns). Such an IoT application may enable a user to provide input (e.g., natural language input) to guide the generative AI. For example, such an IoT application may use a large language model (LLM) to interpret user input (e.g., natural language input) to guide the generative AI.

Another example IoT application that may be distributed by digital marketplace service 352 may enable a user to set up automation rules that govern how the IoT application operates in response to certain inputs and/or to generate certain outputs. Such an automation rule may specify, for example, that all smart door locks should be engaged when a smart security system detects that a homeowner is leaving the house. Such an IoT application may use an LLM to interpret user input (e.g., natural language input) to determine the automation rules. Thus, in further accordance with the previous example, the user may state "lock the doors when I leave" and the IoT application may use an LLM to determine the aforementioned automation rule based on such user input.

IoT applications distributed by digital marketplace service 352 may include stand-alone applications as well as plug-in applications that add specific features to an existing IoT application. Digital marketplace service 352 may also make custom configurations for certain IoT applications available to users. For example, a user may create a custom configuration for an installed instance of an IoT application and digital marketplace service 352 may provide a UI (e.g., digital marketplace UI 316) via which the user may export the custom configuration to digital marketplace service 352 to be shared with other users. The custom configurations may be provided free of charge to select users or to all users, or may be made available for purchase by other users. A revenue sharing model may be used to compensate a user that created the custom configuration as well as an entity that operates IoT application store 350.

IoT application store 350 may further comprise a smart installation service 354. Smart installation service 354 may operate to automatically install an IoT application after a user selects such IoT application for installation through interaction with digital marketplace service 352. Although smart installation service 354 is shown as part of IoT application store 350 in FIG. 3, in an alternate implementation, smart installation service 354 may execute on user device 304 (e.g., as part of IoT application manager 314), or some other device within premises 302. A user may interact with smart installation service 354 via a UI associated therewith. Such UI may comprise, for example, part of digital marketplace UI 316 or IoT application manager 314.

Smart installation service 354 may operate to automatically determine one or more target devices for installation of a selected IoT application and then install an instance of the selected IoT application to such target device(s). Smart installation service 354 may automatically install an instance of the IoT application to a cloud computing platform, a user device, or on an IoT device. For example, as shown in FIG. 3, smart installation service 354 may install an instance of IoT application 320 to a cloud computing platform, as part of cloud deployments 360, to user device 304, or to IoT device 306. Smart installation service 354 may also automatically install an instance of an IoT application across a plurality of devices for distributed execution thereof to facilitate one or more of improved performance, resource sharing, redundancy, or resiliency. For example, smart installation service 354 may install an instance of IoT application 320 across a plurality of IoT devices (e.g., IoT devices 306, 308, 310, 312), a plurality of user devices (e.g., a plurality of user devices 304), or a combination or sub-combination of IoT device(s), user device(s) and cloud servers for distributed execution thereof.

As previously noted, a given IoT application made available for distribution by digital marketplace service 352 may be represented by a plurality of different codebases, each of which may be configured for execution on a different set of host device(s). Smart installation service 354 may utilize such codebases to selectively install the IoT application in a variety of different configurations.

Smart installation service 354 may take into account a variety of factors associated with each eligible host (e.g., cloud, user device, IoT device) in determining where to install an IoT application. For example, smart installation service 354 may consider, for each eligible host: available processing capability, available storage, available power, type and/or quality of network connection, or the like. Smart installation service 354 may also consider factors associated with the IoT application in determining whether to install the IoT application, such as the processing requirements of the IoT application, size of the IoT application, power requirements of the IoT application, input/output requirements of the IoT application, which IoT device(s) the IoT application controls or otherwise interacts with, or the like.

Smart installation service 354 may automatically determine where to install an IoT application without any input from the user, thereby simplifying the installation process for the user. Alternatively or additionally, smart installation service 354 may enable a user to select from among a plurality of eligible installation locations or configurations. Smart installation service 354 may enable a user to select between a "normal" installation mode, in which smart installation service 354 automatically determines where to install the IoT application, and an "expert" installation mode, in which the user selects the target installation location(s).

Smart installation service 354 may also determine where to install an IoT application based on preferences specified by the user. Such preferences may be specified by the user as part of the installation process, as part of registering with IoT application store 350, or at any other suitable time. For example, if a user specifies that the IoT application should be able to run without an Internet connection, then smart installation service 354 may determine that the IoT application should not be installed to the cloud.

When installing an IoT application, smart installation service 354 may determine one or more inputs of the IoT application, one or more outputs of the IoT application, and then map or assign each such input and each output to a corresponding IoT device in a set of IoT devices associated with the user. For example, a music visualizer IoT application may require an audio input for capturing music being played in a premises, and one or more visualization outputs for displaying a light show that varies based on the music. As another example, an IoT application that generates an audible notification when a person is detected on a property may require a video input for detecting the person and an audio output for generating the audible notification. In some instances, an input to an IoT application may comprise information captured by a sensor and an output of an IoT application may comprise a command for controlling an actuator, although this is only an example.

Smart installation service 354 may map the input(s) and/or output(s) of an IoT application to a corresponding IoT device in a set of IoT devices associated with a user based on user input. For example, smart installation service 354 may automatically determine which of the IoT devices associated with the user can provide a particular input or receive a particular output, and then prompt the user to select from among those devices for providing the particular input or receiving the particular output. For example, if the input is an audio input associated with a music visualization IoT application, smart installation service 354 may prompt the user to select from among a set of IoT devices, each of which is capable of capturing audio input (e.g., each of which includes a microphone). If only one IoT device is capable of providing a particular input or output, smart installation service may automatically select that device on behalf of the user or may ask the user to confirm the mapping of the input/output to the IoT device.

Smart installation service 354 may present information to a user associated with each possible IoT device mapping to facilitate the selection process. For example, smart installation service 354 may inform the user how the mapping of a particular IoT device to a particular input or output of the IoT application may impact a performance of the IoT application. Smart installation service 354 may also inform the user how using certain combinations of IoT devices for inputs and/or outputs of the IoT application may impact a performance of the application. The user may beneficially use such information to assign the input(s) and/or output(s) of the IoT application to IoT device(s) that will provide the best performance.

Smart installation service 354 may identify one or more IoT devices that are not associated with the user (e.g., are not owned by the user) but that, if used to provide an input or receive an output of the IoT application, would improve performance of the IoT application. Smart installation service 354 may present information about such IoT device(s) to the user as part of the installation and/or mapping process and may also include information indicating a degree to which performance of the IoT application would be improved if the user utilized such IoT device(s). Smart installation service 354 may also provide the user with a means to purchase or otherwise obtain such IoT device(s). For example, smart installation service 354 may present the user with a link to digital marketplace service 352 that the user may utilize to purchase or otherwise obtain such IoT device(s). Alternatively, smart installation service 354 may provide its own UI for purchasing or obtaining such IoT device(s).

Smart installation service 354 may enable the user to select from among a variety of different device types for performing certain functions associated with the IoT application, including both smart home devices and other device types. For example, smart installation service 354 may enable the user to select a microphone of a remote control associated with a media device (e.g., microphone 112 of remote control 110 associated with media device 106) as an audio input for an IoT application. Likewise, smart installation service 354 may enable the user to select a speaker associated with a television as an audio output for an IoT application. Smart installation service 354 may enable the user to select from among any number of IoT devices in premises 302 for interaction with an IoT application, provided that the installed instance of the IoT application can establish a direct or indirect communication link to such devices (e.g., to obtain input therefrom or provide output thereto).

Smart installation service 354 may automatically assign IoT application inputs and outputs to IoT devices in a set of IoT devices associated with the user without any input from the user. Smart installation service 354 may automatically assign the IoT application inputs and outputs to an initial or default set of IoT devices associated with the user and then provide the user with an opportunity to change the assignments.

To aid in performing the aforementioned mapping/assignment function, smart installation service 354 may be able to access information about a set of IoT devices associated with the user. For example, smart installation service 354 may be able to access information about IoT devices associated with a user in premises 302, including IoT devices 306, 308, 310 and 312. Such information may include, for example and without limitation, a device type, a device manufacturer, a device model, a device software/firmware version, a description of device capabilities, a description of device sensor types, a description of device actuator types, or the like, associated with each IoT device in the set of IoT devices associated with the user. Digital marketplace service 352 may utilize such information to identify eligible IoT devices for assignment of an IoT application input or output.

Smart installation service 354 may obtain such information about the IoT devices associated with the user in a variety of ways. For example, smart installation service 354 may prompt the user to provide information about the IoT devices. As another example, smart installation service 354 may be configured to determine (e.g., automatically or through user input) a device identifier (ID) associated with each IoT device of the user. Smart installation service 354 may then access a database (e.g., maintained as part of IoT application store 350) that maps device IDs to device features to determine a set of features associated with each IoT device.

As another example, smart installation service 354 may obtain information about the IoT devices from the IoT devices themselves utilizing a device discovery protocol supported by the IoT devices and smart installation service 354. For example, such device discovery protocol may enable smart installation service 354 to query the IoT devices for such information or enable the IoT devices to submit such information via a registration process (e.g., at a time of device installation). In further accordance with this example, a bridging device (e.g., an IoT device hub or the like) may be used to provide information to smart installation service 354 about IoT devices that do not support or are not capable of supporting the device discovery protocol. Such device discovery protocol may be implemented using an API that represents diverse IoT devices using a common schema. For example, such schema may define a device type "smart white lightbulb" with operational states "on", "off" and "brightness" and a device type "smart color lightbulb" with operational states "on", "off", "brightness" and "color". In accordance with such an implementation, very different device types (e.g., TVs and lightbulbs) may nevertheless share a common functionality (e.g., displaying a color) and thus the same function could be mapped to very different device types.

Smart installation service 354 may also be able to access a two-dimensional (2D) or three-dimensional (3D) map of the IoT devices associated with the user, wherein the map may represent the premises in which the IoT devices are installed or otherwise located. Such map may comprise information about each of the IoT devices as well as a corresponding map location (e.g., one or more map coordinates) for each IoT device. An example system and method for generating such a map is described in commonly-owned, co-pending U.S. patent application Ser. No. 18/141,120, filed Apr. 28, 2023, and entitled "Map Generator for Map-Based Device Management." Smart installation service 354 may advantageously leverage such positional information about the IoT devices when assigning IoT application inputs and/or outputs. For example, smart installation service 354 may utilize such information in assigning inputs and outputs to IoT devices for IoT applications that have a positional requirement with respect to those inputs and outputs (e.g., a security application that requires video inputs from different locations throughout a home to achieve a desired coverage area, a smart lightbulb application that illuminates smart lightbulbs in an order determined by their physical location to achieve a desired effect (e.g., a "wave"), a music visualizer application that requires video outputs to be in the same area or room as an audio input, or a baby monitor application that requires an audio input proximate to a baby's room).

Thus, in accordance with the foregoing, each IoT device associated with a user (e.g., installed in a premises associated with the user) may have a known or discoverable (e.g., through APIs) set of properties or features that can enable smart installation service 354 to determine whether a given IoT application can run on the user's set of IoT devices and to map the IoT application inputs and outputs to the set of IoT devices.

Smart installation service 354 may also operate to automatically determine the set of inputs and outputs associated with each IoT application that is eligible for distribution by digital marketplace service 352. Smart installation service 354 may automatically determine the set of inputs and outputs in a variety of ways. For example, smart installation service 354 may determine the set of inputs and outputs associated with an IoT application based on metadata provided by a developer or publisher of the IoT application. As another example, smart installation service 354 may automatically determine the set of inputs and outputs associated with an IoT application by performing automated (e.g., static and/or dynamic) code analysis on the IoT application. Still other methods may be used by smart installation service 354 to determine the set of inputs and outputs associated with an IoT application.

Smart installation service 354 may operate to map an input or output of an IoT application to an IoT device that provides a feature set that matches the IoT application's requirements. However, when no such IoT device is available, smart installation service 354 may operate to map the input or output of the IoT application to an IoT device that provides some but not all of the features required by the IoT application, so that the IoT application may still be installed and executed, although at a reduced level of performance. For example, an IoT application that is intended to create a light show using colored light bulbs may still be executed using white light bulbs (e.g., through turning the bulbs on and off and/or adjusting the brightness thereof) and thus smart installation service 354 may map the outputs of such IoT application to a set of white lightbulbs when no color lightbulbs are available. As part of this process, smart installation service 354 may apprise the user of the shortcomings associated with their current set of IoT devices and provide the user with a means for purchasing or otherwise obtaining more suitable IoT devices. For example, smart installation service 354 may present the user with a link to digital marketplace service 352 that the user may utilize to purchase or otherwise obtain such IoT device(s). Alternatively, smart installation service 354 may provide its own UI for purchasing or obtaining such IoT device(s).

Smart installation service 354 may determine that the set of IoT devices associated with the user is not sufficient to support each input and output associated with an IoT application selected for installation. In such a scenario, smart installation service 354 may nevertheless install the IoT application with one or more missing inputs or outputs, if smart installation service 354 determines that the IoT application can still perform at an acceptable level. For example, an IoT application that is intended to create a light show using 48 colored lightbulbs may still be executed using 32 colored lightbulbs and produce an acceptable effect and thus smart installation service 354 may install the IoT application even though there are less than an ideal number of output devices. As part of this process, smart installation service 354 may apprise the user of the shortcomings associated with their current set of IoT devices and provide the user with a means for purchasing or otherwise obtaining additional IoT devices. For example, smart installation service 354 may present the user with a link to digital marketplace service 352 that the user may utilize to purchase or otherwise obtain such additional IoT device(s). Alternatively, smart installation service 354 may provide its own UI for purchasing or obtaining such additional IoT device(s).

Smart installation service 354 may also alert a user to the fact that an IoT application selected by the user will perform sub-optimally with a current set of IoT devices associated with the user and recommend that the user add or upgrade IoT devices for a better performance. In such a case, smart installation service 354 may provide the user with a means to purchase such additional or upgraded IoT devices (e.g., a link to digital marketplace service 352 or a UI provided by smart installation service 354 that the user may utilize to purchase or otherwise obtain such additional or upgraded IoT devices) or may automatically purchase, order or obtain such additional or upgraded IoT devices on behalf of the user.

To perform this function, smart installation service 354 may be able to access data that indicates how a selected IoT application will perform with different sets of IoT devices and IoT device configurations. Such data may be obtained by smart installation service 354 in a variety of ways. For example, smart installation service 354 may obtain such data as part of metadata provided by a developer or publisher of the IoT application or by an entity that operates IoT application store 350 (e.g., who may obtain the data through testing of the IoT application with different sets of IoT devices and IoT device configurations). As another example, such data may be derived from telemetry generated by installed instances of the IoT application. As yet another example, such data may be based on explicit or implicit user feedback collected regarding the IoT application. An example of explicit user feedback may comprise a rating and/or review about the IoT application submitted by a user to digital marketplace service 352 (e.g., via digital marketplace UI 316). An example of implicit user feedback may comprise user-specific IoT application usage statistics.

The aforementioned data that indicates how a selected IoT application will perform with different sets of IoT devices and IoT device configurations may be used to train a machine learning (ML) model. Smart installation service 354 may then utilize such ML model to predict how inputs/outputs of a selected IoT application should be mapped to a set of IoT devices associated with a user to provide the best possible performance. This prediction may then be used to automatically map the inputs/outputs to the IoT devices or to suggest such a mapping to the user.

As previously noted, digital marketplace service 352 may enable a first user to share or sell a custom configuration associated with an IoT application. When a second user selects the custom configuration via digital marketplace service 352, smart installation service 354 may operate to apply the selected custom configuration to the second user's installation of the IoT application. If the first user and the second user have the same set of IoT devices, the application of the selected custom configuration to the second user's installation may be relatively straightforward. However, if the first user and the second user each have a different set of IoT devices, smart installation service 354 may automatically modify the custom configuration to account for differences in a type and/or number of IoT devices associated with each user's setup. Smart installation service 354 may utilize a process (e.g., an ML model) that modifies the configuration in a manner that is deemed most likely to produce a similar result or level of performance as the original configuration but that accords with the constraints of the second user's installation. For example, smart installation service 354 may modify a custom configuration of an array of 200 smart color lightbulbs that produces an image of a nation's flag to generate a custom configuration of an array of 100 smart color lightbulbs that produces a lower resolution image of the same flag. Smart installation service 354 may also modify the configuration to account for different spatial positioning and orientation of IoT devices in cases where the position/orientation of IoT devices influences IoT application performance.

Smart installation service 354 may also determine that the application of a selected custom configuration to the second user's installation will not be successful unless the second user adds or upgrades one or more IoT devices. In such a scenario, smart installation service 354 may provide the second user with a means to purchase such additional or upgraded IoT devices (e.g., a link to digital marketplace service 352 or a UI provided by smart installation service 354 that the user may utilize to purchase or otherwise obtain such additional or upgraded IoT devices) or may automatically purchase, order or obtain such additional or upgraded IoT devices on behalf of the user.

IoT application store 350 may further comprise an automatic updating service 356. Automatic updating service 356 may operate to update an installed instance of an IoT application or a configuration thereof. Although automatic updating service 356 is shown as part of IoT application store 350 in FIG. 3, in an alternate implementation, automatic updating service 356 may execute on user device 304 (e.g., as part of IoT application manager 314), or some other device within premises 302. A user may interact with automatic updating service 356 via a UI associated therewith. Such UI may comprise, for example, part of digital marketplace UI 316 or IoT application manager 314.

Automatic updating service 356 may be configured to run on a periodic or intermittent basis and/or in response to one or more events. For example, automatic updating service 356 may be configured to execute based on a user invocation thereof (e.g., via user interaction with IoT application management tools 318 of IoT application manager 314), based on an availability of a software update associated with the installed IoT application, based on application of a software or firmware update to an IoT device that is controlled by or otherwise interacts with the installed IoT application, based on a change in state or unavailability of a host device (e.g., user device, IoT device, cloud computing platform or server)

upon which the IoT application is installed, based on a change in state or unavailability of an IoT device that the installed IoT application is configured to control or otherwise interact with, and/or based on the addition of new IoT devices or host devices to a premises (e.g., premises 302). However, these are only some examples and automatic updating service 356 may be configured to execute based on other events as well.

Automatic updating service 356 may determine that an event has occurred (e.g., an event that renders updating the installed IoT application useful or beneficial), and then prompt the user to select whether or not an automatic update of the installed IoT application should be performed (e.g., immediately or at a later time) based on the occurrence of the event. For example, automatic updating service 356 may prompt the user to select whether or not an automatic update of the installed IoT application should be performed in response to determining (i) that a software update associated with the installed IoT application is available, (ii) that a software or firmware upgrade has been applied to an IoT device that is controlled by or otherwise interacts with the installed IoT application, (iii) that a host device (e.g., user device, IoT device, cloud computing platform or server) upon which the IoT application is installed has undergone a change of state or is unavailable, (iv) that an IoT device that the installed IoT application is configured to control or otherwise interact with has undergone a state of change or is unavailable, and/or (v) that a new IoT device or host device has been added to a premises (e.g., premises 302). However, these are only some examples and automatic updating service 356 may be configured to prompt the user to select whether or not an automatic update of the installed IoT application should be performed in response to other determinations as well.

Automatic updating service 356 may be configured to update an installed IoT application by applying a software modification (e.g., patch, update, upgrade, support pack, hotfix, or the like) to the installed IoT application.

Automatic updating service 356 may also be configured to update an installed IoT application by uninstalling the IoT application from a first set of host devices and reinstalling the IoT application on a second set of host devices. For example, if one or more host devices in the first set of host devices is underperforming, resource constrained (e.g., processor, storage, or power constrained), or unavailable, automatic updating service 356 may uninstall the IoT application therefrom and reinstall it on the second set of host devices. This may entail, by way of example only and without limitation, uninstalling an IoT application from the cloud and reinstalling it on one or more user devices or IoT devices, uninstalling an IoT application from one or more user devices or IoT devices and reinstalling it on the cloud, uninstalling an IoT application from one or more user devices and reinstalling it on one or more IoT devices, or uninstalling an IoT application from one or more IoT devices and reinstalling it on one or more user devices.

Automatic updating service 356 may also be configured to update an installed IoT application by reassigning or remapping an input or output thereof from a first IoT device to a second IoT device. For example, automatic updating service 356 may determine that a change has been made to a set of IoT devices associated with the user. In further accordance with this example, automatic updating service 356 may determine that a first IoT device that was previously assigned to an input or output of the installed IoT application is no longer functioning or is otherwise unavailable (e.g. the user may have uninstalled the first IoT device, the first IoT device may have been powered down or lost power, or the first IoT device may have lost network connectivity). In response to at least this determination, automatic updating service 356 may selectively assign a second IoT device in the set of IoT devices associated with the user to the input or output and configure the installed IoT application to obtain the input or provide the output to the second IoT device. Thus, automatic updating service 356 may automatically "self heal" the deployment of the IoT application when an associated IoT device is no longer functioning or is otherwise unavailable.

Automatic updating service 356 may alternatively present the user with a list of eligible replacement IoT devices for the first IoT device from among the set of IoT devices and allow the user to select the replacement IoT device therefrom. Still further, automatic updating service 356 may enable the user to obtain (e.g., purchase) a new IoT device from which the input can be obtained or to which the output can be provided. For example, automatic updating service 356 may provide the user with a means to purchase such new IoT device (e.g., a link to digital marketplace service 352 or a UI provided by automatic updating service 356 that the user may utilize to purchase or otherwise obtain the new IoT device) or may automatically purchase, order or obtain the new IoT device on behalf of the user. Thus, automatic updating service 356 may enable a user to easily replace malfunctioning IoT devices upon which their IoT applications depend.

As another example, automatic updating service 356 may determine that a new IoT device has been added to the set of IoT devices associated with the user and that the new IoT device may be mapped to an input or output of an installed IoT application. In such a scenario, automatic updating service 356 may automatically re-map an input/output assigned from an older IoT device to the new IoT device, or map a currently unassigned input/output to the new IoT device. Automatic updating service 356 may be configured to perform such remapping or mapping, for example, in response to determining that such remapping or mapping will result in an improved performance of the IoT application. Automatic updating service 356 may also enable the user to select whether such remapping or mapping should be carried out.

To enable automatic updating service 356 to remap inputs/outputs of an IoT application from a first IoT device to a second IoT device as discussed above, or to map unassigned inputs/output of an IoT application to a new IoT device as discussed above, automatic updating service 356 may be configured to access information concerning each IoT device that may include a set of properties or features associated therewith. A more expanded description of such information and how it may be obtained was provided above in reference to smart installation service 354, and thus such description will not be repeated here for the sake of brevity.

Automatic updating service 356 may be able to access a continuously updated 2D or 3D map of a set of IoT devices associated with a user. As previously noted, an example system and method for generating such a map is described in commonly-owned, co-pending U.S. patent application Ser. No. 18/141,120, filed Apr. 28, 2023, and entitled "Map Generator for Map-Based Device Management." In such a case, automatic updating service 356 may be configured to update an installed IoT application based on detecting a change in location or orientation of an IoT device that is controlled by or otherwise interacts with the IoT application. This may be particularly beneficial in cases in which the location or orientation of the IoT device is important to or otherwise affects the performance of the IoT application. For example, if the IoT application is a baby monitor that depends upon an audio input located relatively close to a baby's room, and the IoT device that provides such audio input is moved to a different location in a premises, then automatic updating service 356 may operate to switch the audio input to a new IoT device that is now closer to the baby's room. As another example, if the IoT application is a home security application that depends upon a video input that provides a view of a front doorstep and the IoT device that provides such video input is moved such that it can no longer provide the required view, then automatic updating service 356 may operate to switch to a different IoT device to provide the requisite video input, if available. Automatic updating service 356 may also notify the user if a change of location or orientation of an IoT device has affected the performance of an IoT application. Automatic updating service 356 may also prompt the user to confirm a suggested change of input or output before implementing the same.

IoT application store 350 may further comprise a virtual deployment service 358. Virtual deployment service 358 may enable a user to deploy an instance of a selected IoT application (e.g., IoT application 320) to a virtual environment 362 in which the instance of the selected IoT application may interact with one or more simulated IoT devices. Virtual environment 362 may be executed by one or more servers of a cloud computing platform, as represented by cloud deployments 360 in FIG. 3, although virtual environment 362 may be hosted on other devices as well (e.g., user device 304). A user may interact with virtual deployment service 358 via a UI associated therewith. Such UI may comprise, for example, part of digital marketplace UI 316 or IoT application manager 314.

Virtual deployment service 358 may enable a user to deploy to virtual environment 362 an IoT application that the user has selected via interaction with digital marketplace service 352, but has not yet purchased or installed to any physical devices associated with the user. This may enable the user to observe the performance of the selected IoT application, determine the suitability of the selected IoT application for installation with the user's IoT devices, and/or test various configurations of the IoT application without first purchasing the IoT application or installing it on the physical devices associated with the user.

For example, virtual deployment service 358 may enable a user to configure and execute an instance of a selected IoT application in virtual environment 362 prior to purchasing the IoT application or installing the selected IoT application for use with his/her own physical IoT devices. Then, when the IoT application is configured to the user's satisfaction and running successfully in virtual environment 362, the user may purchase the IoT application and/or initiate installation thereof for use with his/her own physical IoT devices. Smart installation service 354 may then install the IoT application to one or more physical devices associated with the user in a manner described above and transfer the user-created configuration of the instance of the IoT application installed in virtual environment 362 to the real-world installation of the IoT application.

Virtual deployment service 358 may also enable a user to deploy to virtual environment 362 an instance of an IoT application that the user has already installed to one or more physical devices associated therewith. This feature may enable the user to test various changes to the IoT application after installation thereof in virtual environment 362 without impacting the current (physical) setup.

As noted above, virtual deployment service 358 may enable an instance of an IoT application deployed to virtual environment 362 to interact with one or more simulated IoT devices. The simulated IoT devices may represent a set of IoT devices currently owned by the user. For example, virtual deployment service 358 may be able to collect information about the user's IoT devices using any of the techniques previously described in reference to smart installation service 354 and utilize such information to instantiate software simulations of those IoT devices. In further accordance with such an implementation, virtual deployment service 358 may automatically map the IoT application inputs and outputs to the simulated IoT devices using techniques described above in reference to smart installation service 354.

Alternatively, virtual deployment service 358 may instantiate the software simulations of the user's IoT devices based on user-provided information about those IoT devices. For example, virtual deployment service 358 may present the user with a GUI that enables the user to select his/her IoT devices from among a set of IoT devices displayed in the GUI, and then create simulated IoT devices based on the user's selections. The simulated IoT devices may represent generic IoT device types or specific real world brands/models of IoT devices. The simulated IoT devices may also represent IoT devices that the user does not currently own but could acquire in the future. Each simulated IoT device may be configured to interact with the instance of the IoT application installed in virtual environment 362 in a manner similar to how a corresponding real world (physical or hardware-based) version of the IoT device would interact with the IoT application.

Virtual deployment service 358 may enable the user to add any number of simulated IoT devices to a virtual deployment. For example, virtual deployment service 358 may enable a user to deploy a music visualizer IoT application (e.g., an IoT application that changes a color, a brightness, and/or an on/off state of various smart lightbulbs over time in a manner that is synchronized with or otherwise based on a song) to virtual environment 362 and then add any number of simulated smart lightbulbs to the deployment to visualize how the IoT application controls the virtual smart lightbulbs over time based on a particular song.

Virtual deployment service 358 may assist a user in obtaining or purchasing real-world versions of simulated IoT devices that the user has added to a virtual deployment but that the user does not currently own. For example, virtual deployment service 358 may automatically determine a cost associated with obtaining such IoT devices and present the cost to the user. Furthermore, virtual deployment service 358 may provide a UI via which the user can order some or all of the IoT devices that the user has added to a virtual deployment but that they do not currently own.

In an implementation in which virtual deployment service 358 is able to access a 2D or 3D map of the real-world location of the user's IoT devices, virtual deployment service 358 may position the simulated IoT devices in simulated 2D or 3D space in a manner that accords with or is otherwise based on their current real-world location. Virtual deployment service 358 may further enable the user to adjust the location and/or orientation of the simulated IoT devices in the simulated 2D or 3D space as part of the simulation. Thus, for example, the user may rearrange the location of various simulated smart lightbulbs in a simulated 3D space as part of testing a music visualizer IoT application.

Virtual deployment service 358 may further enable a user to connect an instance of a selected IoT application that is deployed to virtual environment 362 to one or more physical IoT devices associated with the user to enable the user to observe how the IoT application performs with those physical IoT devices. Thus, the user may create a hybrid deployment in which some of the IoT application inputs or outputs are assigned to physical IoT devices associated with the user and other ones of the IoT application inputs or outputs are assigned to simulated IoT devices. The user may create such a hybrid deployment, for example, to determine how an IoT application would perform if the user's existing network of physical IoT devices were extended to include one or more additional IoT devices (wherein the additional IoT device(s) may be represented as simulated IoT device(s)) or to determine how an IoT application would perform with the user's existing network of physical devices if one or more of the physical IoT devices were upgraded (wherein the upgraded IoT device(s) may be represented as simulated IoT device(s)).

Although only a single premises 302, with associated user device 304 and set of IoT devices 306, 308, 310 and 312, is shown in FIG. 3 for the sake of simplicity, it is to be understood that system 300 may include any number of premises (including hundreds, thousands, tens of thousands, hundreds of thousands, millions, or hundreds of millions of premises), each with its own user device(s) and IoT devices, and that IoT application store 350 may be used to distribute IoT applications to each such premises for use in conjunction with the IoT devices deployed therein. It is to be further understood that although only a single IoT application store 350 is shown in FIG. 3, system 300 may include multiple instances of IoT application store 350 that may be concurrently executed to distribute such IoT applications.

FIG. 4 illustrates a flow diagram of a method 400 for implementing an IoT application store, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIG. 3. However, method 400 is not limited to that example embodiment.

In 402, digital marketplace service 352 enables a user to browse a plurality of IoT applications and to select one of the IoT applications (e.g., IoT application 320) in the plurality of applications for installation.

In 404, smart installation service 354 determines a first input or a first output of the selected IoT application.

In 406, smart installation service 354 selectively assigns a first IoT device in a set of IoT devices associated with the user (e.g., the set of IoT devices 306, 308, 310 and 312) to the first input or the first output. Smart installation service 354 may perform this operation, for example, by determining a set of capabilities associated with the first IoT device and determining that the first input can be obtained from the first IoT device or that the first output can be provided to the first IoT device based on the set of capabilities associated with the first IoT device.

In 408, smart installation service 354 installs a first instance of the selected IoT application (e.g. IoT application 320) on one or more devices that comprise or are communicatively connected to the first IoT device (e.g., one or more of user device 304, IoT devices 306, 308, 310 or 312, or a server used to implement cloud deployments 360), wherein the installing comprises configuring the first instance of the selected IoT application to obtain the first input from the first IoT device or provide the first output to the IoT device based on the assignment of the first IoT device to the first input or the first output.

Installing the first instance of the selected IoT application in 408 may comprise selectively installing the first instance of the selected IoT application on one or more of a cloud computing platform (e.g., cloud deployment 360), a computing device associated with the user (e.g., user device 304), or an IoT device in the set of IoT devices (e.g., IoT device 306, 308, 310 or 312). Such selective installation may be automatic and based on, for example, various aspects of the selected IoT application and/or the available installation options. Such selective installation may also be based on a user selection or preferences.

FIG. 5 illustrates a flow diagram of a method 500 for selectively assigning an IoT device in a set of IoT devices associated with a user to an input or an output of an IoT application, according to some embodiments. Method 500 may be used, for example, to implement 406 of method 400. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIG. 3. However, method 500 is not limited to that example embodiment.

In 502, smart installation service 354 identifies a subset of the set of IoT devices associated with the user (e.g., the set of IoT devices 306, 308, 310 and 312) that includes the first IoT device and from which the first input of the IoT application can be obtained or to which the first output of the IoT device can be provided.

In 504, smart installation service 354 presents the list of the IoT devices in the subset to the user. In an embodiment, smart installation service 354 may present the list of the IoT devices along with an indication of how the selected IoT application will perform if each IoT device in the list is selected.

In 506, responsive to a user selection of the first IoT device from the list of IoT devices in the subset, smart installation service 354 assigns the first IoT device to the first input or the first output.

FIG. 6 illustrates a flow diagram of a method 600 for enabling a user to obtain an IoT device from which an input of an IoT application can be obtained or to which an output of the IoT application can be provided, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 3. However, method 600 is not limited to that example embodiment.

In 602, smart installation service 354 determines a second input or a second output of the selected IoT application.

In 604, smart installation service 604 identifies an IoT device that is not included in the set of IoT devices associated with the user and from which the second input can be obtained or to which the second output can be provided. The second IoT device may comprise, for example and without limitation, an IoT device that is required or recommended for execution of the IoT application but that the user does not currently own or an IoT device that will provide for improved performance of the selected IoT application as compared to an IoT device in the set of IoT devices associated with the user.

In 606, smart installation service 354 enables the user to obtain (e.g., purchase) the second IoT device. For example, smart installation service 354 may present the user with a UI via which the user may obtain the second IoT device or provide the user with a link to digital marketplace service 352 that the user may utilize to obtain the second IoT device.

Figure 7:
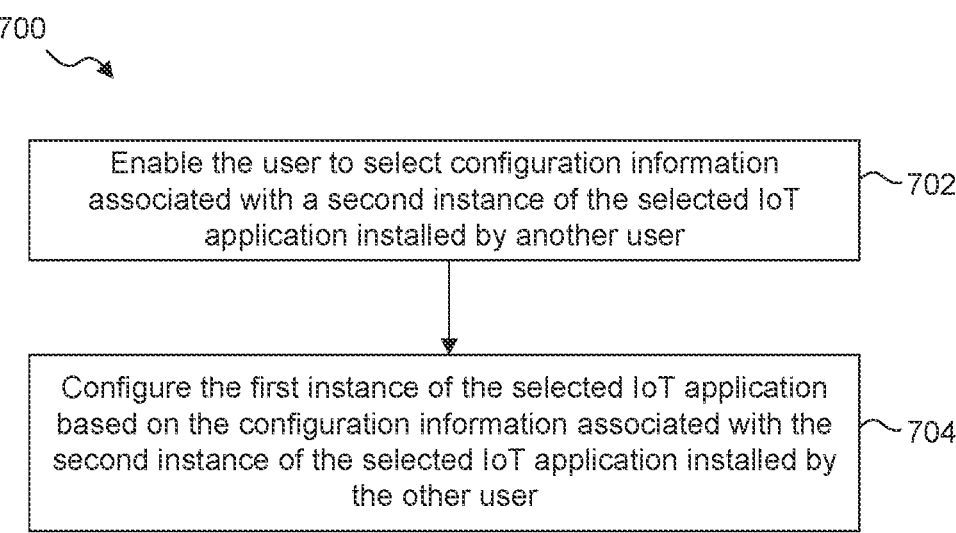
FIG. 7 illustrates a flow diagram of a method for configuring a first instance of an IoT application associated with a first user based on configuration information associated with a second instance of the IoT application associated with a second user, according to some embodiments.

FIG. 7 illustrates a flow diagram of a method 700 for configuring a first instance of an IoT application associated with a first user based on configuration information associated with a second instance of the IoT application associated with a second user, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIG. 3. However, method 700 is not limited to that example embodiment.

In 702, digital marketplace service 352 enables the user to select configuration information associated with a second instance of the selected IoT application installed by another user.

In 704, smart installation service 354 configures the first instance of the selected IoT application based on the configuration information associated with the second instance of the selected IoT application installed by the other user. In an embodiment, 704 entails utilizing an ML model to adapt the configuration information associated with the second instance of the selected IoT application to the first instance of the IoT application.

Figure 8:
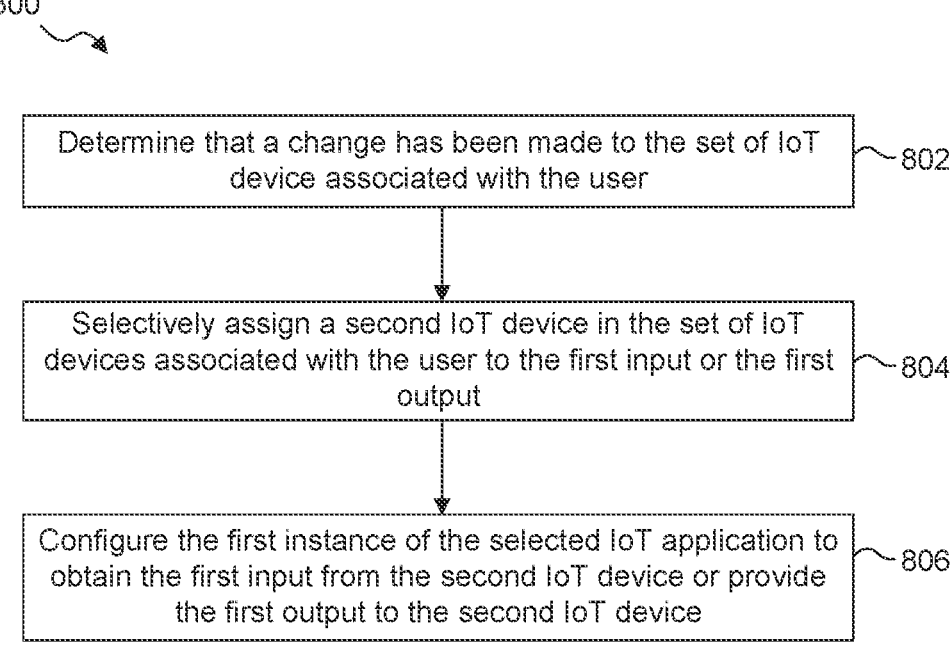
FIG. 8 illustrates a flow diagram of a method for automatically updating an IoT application to interact with a second IoT device instead of a first IoT device, according to some embodiments.

FIG. 8 illustrates a flow diagram of a method 800 for automatically updating an IoT application to interact with a second IoT device instead of a first IoT device, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 shall be described with reference to FIG. 3. However, method 800 is not limited to that example embodiment.

In 802, automatic updating service 356 determines that a change has been made to the set of IoT devices associated with the user (e.g., the set of IoT devices 306, 308, 310 and 312). For example, automatic updating service 356 may determine that the first IoT device is unavailable or that a new device has been added to the set of IoT devices that will provide for better performance of the selected IoT application than the first IoT device. In response to the determination in 802, 804 and 806 may be performed.

In 804, automatic updating service 356 selectively assigns a second IoT device in the set of IoT devices associated with the user to the first input or the first output that was previously assigned to the first IoT device.

In 806, automatic updating service 356 configures the first instance of the selected IoT application to obtain the first input from the second IoT device or provide the first output to the second IoT device.

FIG. 9 illustrates a flow diagram of a method 900 for enabling a user to obtain an IoT device to be used with an IoT application in response to determining that a change has been made in a set of IoT devices associated with the user, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art.

Method 900 shall be described with reference to FIG. 3. However, method 900 is not limited to that example embodiment.

In 902, automatic updating service 356 determines that a change has been made to the set of IoT devices associated with the user. For example, automatic updating service 356 may determine that the first IoT device is unavailable. In response to the determination in 902, 904 and 906 may be performed.

In 904, automatic updating service 356 determines that there are no IoT devices in the set of IoT devices associated with the user from which the first input can be obtained or to which the first output can be provided.

In 906, automatic updating service 356 enables the user to obtain (e.g., purchase) an IoT device from which the first input can be obtained or to which the first output can be provided. For example, automatic updating service 356 may present the user with a UI via which the user may obtain the second IoT device or provide the user with a link to digital marketplace service 352 that the user may utilize to obtain the second IoT device.

FIG. 10 illustrates a flow diagram of a method 1000 for enabling a user to deploy an instance of an IoT application to a virtual environment, according to some embodiments. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art.

Method 1000 shall be described with reference to FIG. 3. However, method 1000 is not limited to that example embodiment.

In 1002, virtual deployment service 358 enables the user to deploy a second instance of the selected IoT application to a virtual environment (e.g., virtual environment 362) in which the second instance of the selected IoT applications interacts with one or more simulated IoT devices.

In 1004, virtual deployment service 358 enables the user to connect the second instance of the selected IoT application deployed to the virtual environment to at least one IoT device in the set of IoT devices associated with the user (e.g., at least one of IoT device 306, 308, 310 or 312).

Example Computer System

Figure 11:
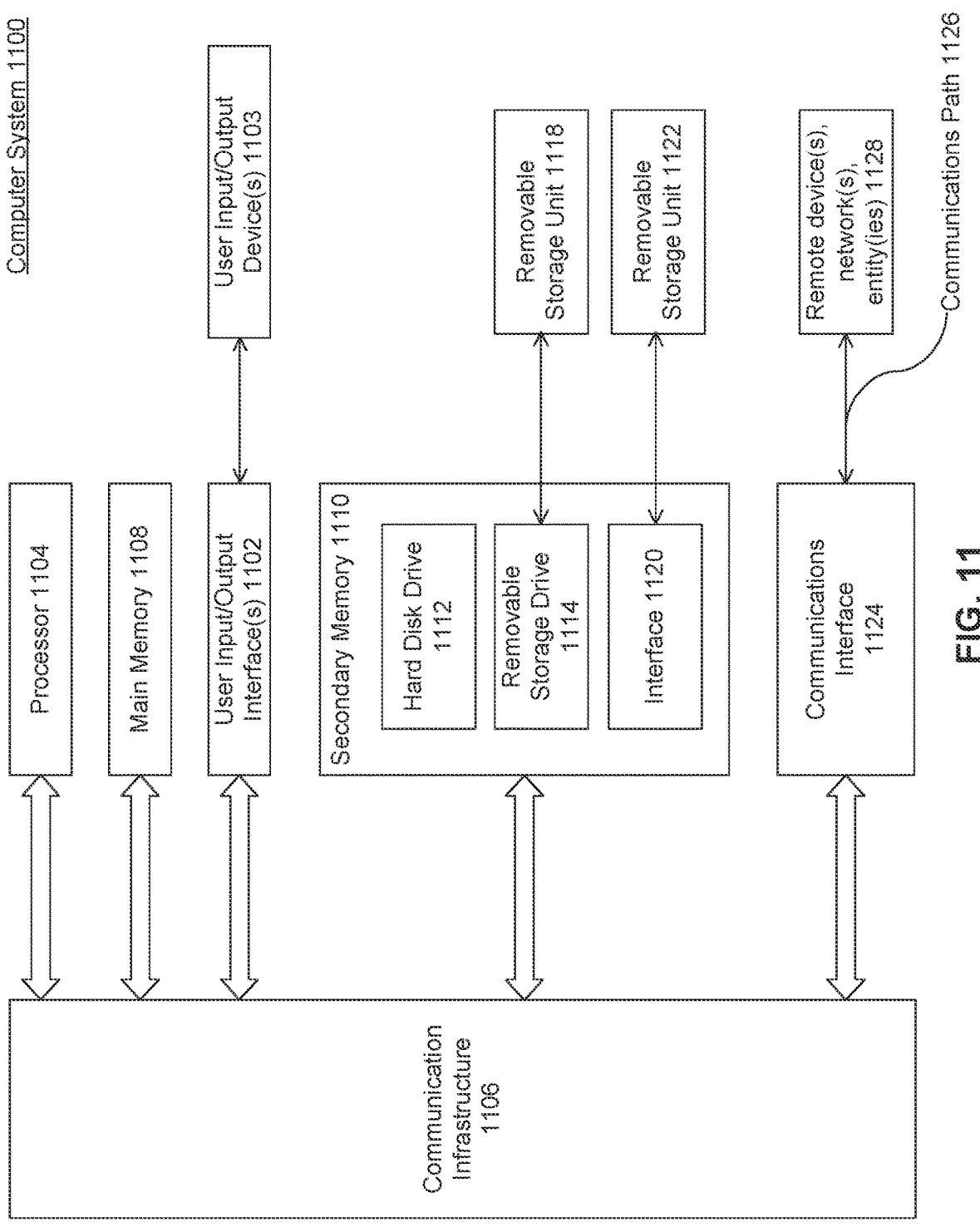
FIG. 11 illustrates an example computer system useful for implementing various embodiments.

Various embodiments may be implemented, for example, using one or more well-known computer systems, such as computer system 1100 shown in FIG. 11. For example, one or more of user device 304, IoT device 306, IoT device 308, IoT device 310, IoT device 312, IoT application store 350, digital marketplace service 352, smart installation service 354, automatic updating service 356, virtual deployment service 358 or cloud deployments 360 may be implemented using combinations or sub-combinations of computer system 1100. Also or alternatively, one or more computer systems 1100 may be used, for example, to implement any of the embodiments discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more of processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100 or processor(s) 1104), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for implementing an Internet of Things (IoT) application store, comprising:
    providing, by at least one computer processor, a digital marketplace service that enables a user to browse a plurality of IoT applications on a digital marketplace user interface and to select one of the IoT applications in the plurality of IoT applications for installation; and
providing a smart installation service that (i) determines a first input or a first output of the selected IoT application, (ii) selectively assigns a first IoT device in a set of IoT devices associated with the user to the first input or the first output, and (iii) installs a first instance of the selected IoT application on one or more devices that comprise or are communicatively connected to the first IoT device, wherein installing the first instance of the selected IoT application comprises configuring the first instance of the selected IoT application to obtain the first input from the first IoT device or provide the first output to the first IoT device based on the assignment of the first IoT device to the first input or the first output,
wherein the digital marketplace service enables the user to select configuration information associated with a second instance of the selected IoT application installed by another user; and
wherein the smart installation service (i) receives data, derived from telemetry generated by installed instances of the selected IoT application, indicating how the selected IoT application will perform with different sets of IoT devices and IoT device configurations, (ii) uses a machine-learning model trained on the data to map inputs and outputs of the selected IoT application to the set of IoT devices associated with the user to improve performance of the selected IoT application, (iii) adapts the configuration information associated with the second instance of the selected IoT application to the first instance of the selected IoT application based on output of the machine-learning model, and (iv) configures the first instance of the selected IoT application based on the configuration information associated with the second instance of the selected IoT application installed by the other user, as adapted based on the output of the machine-learning model.

2. The computer-implemented method of claim 1, wherein the smart installation service selectively installs the first instance of the selected IoT application on one or more of a cloud computing platform, a computing device associated with the user, or an IoT device in the set of IoT devices.

3. The computer-implemented method of claim 1, wherein the smart installation service selectively assigns the first IoT device to the first input or the first output by:
    identifying a subset of the set of IoT devices that includes the first IoT device and from which the first input is obtained or to which the first output is provided;
    presenting a list of the IoT devices in the subset to the user; and
    responsive to a user selection of the first IoT device from the list of IoT devices in the subset, assigning the first IoT device to the first input or the first output.

4. The computer-implemented method of claim 1, wherein the smart installation service determines a second input or a second output of the selected IoT application, identifies a second IoT device that is not included in the set of IoT devices associated with the user and from which the second input is obtained or to which the second output is provided, and enables the user to obtain the second IoT device.

5. The computer-implemented method of claim 1, further comprising:
    providing an automatic updating service that determines that a change has been made to the set of IoT devices associated with the user and, responsive to at least determining that the change had been made, selectively assigns a second IoT device in the set of IoT devices associated with the user to the first input or the first output, and configures the first instance of the selected IoT application to obtain the first input from the second IoT device or provide the first output to the second IoT device.

6. The computer-implemented method of claim 1, further comprising:

providing an automatic updating service that determines that a change has been made to the set of IoT devices associated with the user and, responsive to at least determining that the change has been made, determines that there are no IoT devices in the set of IoT devices associated with the user from which the first input is obtained or to which the first output is provided, and enables the user to obtain an IoT device from which the first input is obtained or to which the first output is provided.

7. The computer-implemented method of claim 1, further comprising:

providing a virtual deployment service that enables the user to deploy a third instance of the selected IoT application to a virtual environment in which the third instance of the selected IoT application interacts with one or more simulated IoT devices.

8. The computer-implemented method of claim 7, wherein the virtual deployment service further enables the user to connect the third instance of the selected IoT application deployed to the virtual environment to at least one IoT device in the set of IoT devices associated with the user.

9. A system, comprising:

one or more memories; and at least one processor each coupled to at least one of the memories and configured to perform operations comprising:

providing a digital marketplace service that enables a user to browse a plurality of Internet of Things (IoT) applications on a digital marketplace user interface and to select one of the IoT applications in the plurality of IoT applications for installation; and providing a smart installation service that (i) determines a first input or a first output of the selected IoT application, (ii) selectively assigns a first IoT device in a set of IoT devices associated with the user to the first input or the first output, and (iii) installs a first instance of the selected IoT application on one or more devices that comprise or are communicatively connected to the first IoT device, wherein installing the first instance of the selected IoT application comprises configuring the first instance of the selected IoT application to obtain the first input from the first IoT device or provide the first output to the first IoT device based on the assignment of the first IoT device to the first input or the first output, wherein the digital marketplace service enables the user to select configuration information associated with a second instance of the selected IoT application installed by another user; and wherein the smart installation service (i) receives data, derived from telemetry generated by installed instances of the selected IoT application, indicating how the selected IoT application will perform with different sets of IoT devices and IoT device configurations, (ii) uses a machine-learning model trained on the data to map inputs and outputs of the selected IoT application to the set of IoT devices associated with the user to improve performance of the selected IoT application, (iii) adapts the configuration information associated with the second instance of the selected IoT application to the first instance of the selected IoT application based on output of the machine-learning model, and (iv) configures the first instance of the selected IoT application based on the configuration information associated with the second instance of the selected IoT application installed by the other user, as adapted based on the output of the machine-learning model.

10. The system of claim 9, wherein the smart installation service selectively installs the first instance of the selected IoT application on one or more of a cloud computing platform, a computing device associated with the user, or an IoT device in the set of IoT devices.

11. The system of claim 9, wherein the smart installation service selectively assigns the first IoT device to the first input or the first output by:

identifying a subset of the set of IoT devices that includes the first IoT device and from which the first input is obtained or to which the first output is provided;

presenting a list of the IoT devices in the subset of IoT devices to the user; and responsive to a user selection of the first IoT device from the list of IoT devices in the subset, assigning the first IoT device to the first input or the first output.

12. The system of claim 9, wherein the smart installation service determines a second input or a second output of the selected IoT application, identifies a second IoT device that is not included in the set of IoT devices associated with the user and from which the second input is obtained or to which the second output is provided, and enables the user to obtain the second IoT device.

13. The system of claim 9, wherein the operations further comprise:

providing an automatic updating service that determines that a change has been made to the set of IoT devices associated with the user and, responsive to at least determining that the change had been made, selectively assigns a second IoT device in the set of IoT devices associated with the user to the first input or the first output, and configures the first instance of the selected IoT application to obtain the first input from the second IoT device or provide the first output to the second IoT device.

14. The system of claim 9, wherein the operations further comprise:

providing an automatic updating service that determines that a change has been made to the set of IoT devices associated with the user and, responsive to at least determining that the change has been made, determines that there are no IoT devices in the set of IoT devices associated with the user from which the first input is obtained or to which the first output is provided, and enables the user to obtain an IoT device from which the first input is obtained or to which the first output is provided.

15. The system of claim 9, wherein the operations further comprise:

providing a virtual deployment service that enables the user to deploy a third instance of the selected IoT application to a virtual environment in which the third instance of the selected IoT application interacts with one or more virtual IoT devices.

16. The system of claim 15, wherein the virtual deployment service further enables the user to connect the third instance of the selected IoT application deployed to the virtual environment to at least one IoT device in the set of IoT devices associated with the user.

17. A non-transitory computer-readable medium having instructions stored thereon that, when executed by at least one computing device, cause the at least one computing device to perform operations, the operations comprising:

providing a digital marketplace service that enables a user to browse a plurality of Internet of Things (IoT) applications on a digital marketplace user interface and to select one of the IoT applications in the plurality of IoT applications for installation; and providing a smart installation service that (i) determines a first input or a first output of the selected IoT application, (ii) selectively assigns a first IoT device in a set of IoT devices associated with the user to the first input or the first output, and (iii) installs a first instance of the selected IoT application on one or more devices that comprise or are communicatively connected to the first IoT device, wherein installing the first instance of the selected IoT application comprises configuring the first instance of the selected IoT application to obtain the first input from the first IoT device or provide the first output to the first IoT device based on the assignment of the first IoT device to the first input or the first output, wherein the digital marketplace service enables the user to select configuration information associated with a second instance of the selected IoT application installed by another user; and wherein the smart installation service (i) receives data, derived from telemetry generated by installed instances of the selected IoT application, indicating how the selected IoT application will perform with different sets of IoT devices and IoT device configurations, (ii) uses a machine-learning model trained on the data to map inputs and outputs of the selected IoT application to the set of IoT devices associated with the user to improve performance of the selected IoT application, (iii) adapts the configuration information associated with the second instance of the selected IoT application to the first instance of the selected IoT application based on output of the machine-learning model, and (iv) configures the first instance of the selected IoT application based on the configuration information associated with the second instance of the selected IoT application installed by the other user, as adapted based on the output of the machine-learning model.

18. The non-transitory computer-readable medium of claim 17, wherein the smart installation service selectively installs the first instance of the selected IoT application on one or more of a cloud computing platform, a computing device associated with the user, or an IoT device in the set of IoT devices.

19. The non-transitory computer-readable medium of claim 17, wherein the operations further comprise:

providing an automatic updating service that determines that a change has been made to the set of IoT devices associated with the user and, responsive to at least determining that the change had been made, selectively assigns a second IoT device in the set of IoT devices associated with the user to the first input or the first output, and configures the first instance of the selected IoT application to obtain the first input from the second IoT device or provide the first output to the second IoT device.

20. The non-transitory computer-readable medium of claim 17, wherein the operations further comprise:

providing an automatic updating service that determines that a change has been made to the set of IoT devices associated with the user and, responsive to at least determining that the change has been made, determines that there are no IoT devices in the set of IoT devices associated with the user from which the first input is obtained or to which the first output is provided, and enables the user to obtain an IoT device from which the first input is obtained or to which the first output is provided.

* * * * *